US007110465B2

(12) United States Patent
Kaku et al.

(10) Patent No.: US 7,110,465 B2
(45) Date of Patent: Sep. 19, 2006

(54) NOISE CANCELING METHOD AND APPARATUS

(75) Inventors: Takashi Kaku, Kawasaki (JP); Hideo Miyazawa, Kawasaki (JP); Takahiro Kurakata, Kawasaki (JP); Hiroyasu Murata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 665 days.

(21) Appl. No.: 09/819,395

(22) Filed: Mar. 28, 2001

(65) Prior Publication Data

US 2002/0064234 A1 May 30, 2002

(30) Foreign Application Priority Data

Nov. 27, 2000 (JP) ............................. 2000-359949

(51) Int. Cl.
*H04B 15/00* (2006.01)

(52) U.S. Cl. ...................................................... 375/285

(58) Field of Classification Search ................ 375/284, 375/285, 296, 346, 367, 286; 381/94.1, 94.7, 381/94.8; 704/213, 228; 379/406.01

See application file for complete search history.

(56) References Cited

U.S. PATENT DOCUMENTS 5,583,887 A 12/1996 Murata et al.
6,215,798 B1 * 4/2001 Carneheim et al. ......... 370/515
6,229,859 B1 * 5/2001 Jeong et al. ................ 375/354
6,498,820 B1 * 12/2002 Thomson et al. ........... 375/346
6,501,804 B1 * 12/2002 Rudolph et al. ............ 375/285

FOREIGN PATENT DOCUMENTS

| | | |
|---|---|---|
| EP | 0 798 871 | 10/1997 |
| EP | 0 987 829 | 3/2000 |
| JP | 05-260100 | 10/1993 |
| JP | 10-209889 | 8/1998 |
| JP | 11-168446 | 6/1999 |
| JP | 2000-286817 | 10/2000 |

OTHER PUBLICATIONS

Notification of Reasons for Refusal mailed Nov. 5, 2002.

* cited by examiner

*Primary Examiner*—Khanh Tran
*Assistant Examiner*—Sam K. Ahn
(74) *Attorney, Agent, or Firm*—Katten Muchin Rosenman LLP

(57) ABSTRACT

In a noise canceling method and an apparatus therefor which notices the colored noise looked macroscopically, positively cancels the dominant noise component in the low frequency band, shifts the S/N value to plus, and can extract the reception signal buried in the low frequency band and having a comparatively high level, a signal in which a time axis, an amplitude, and a phase are specified or a zero-point signal is inserted into a transmission signal by an inserter, a noise component is interpolated by using the specified signal or the zero-point signal by a noise canceler, and an originally transmitted signal is regenerated by subtracting the noise component from the reception signal.

22 Claims, 21 Drawing Sheets

PRESENT INVENTION

FIG. 2A PRIOR ART
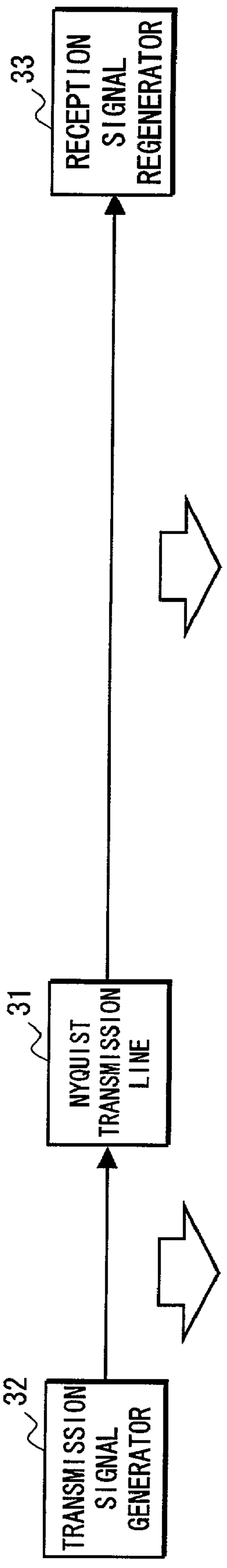
FIG. 2B PRESENT INVENTION
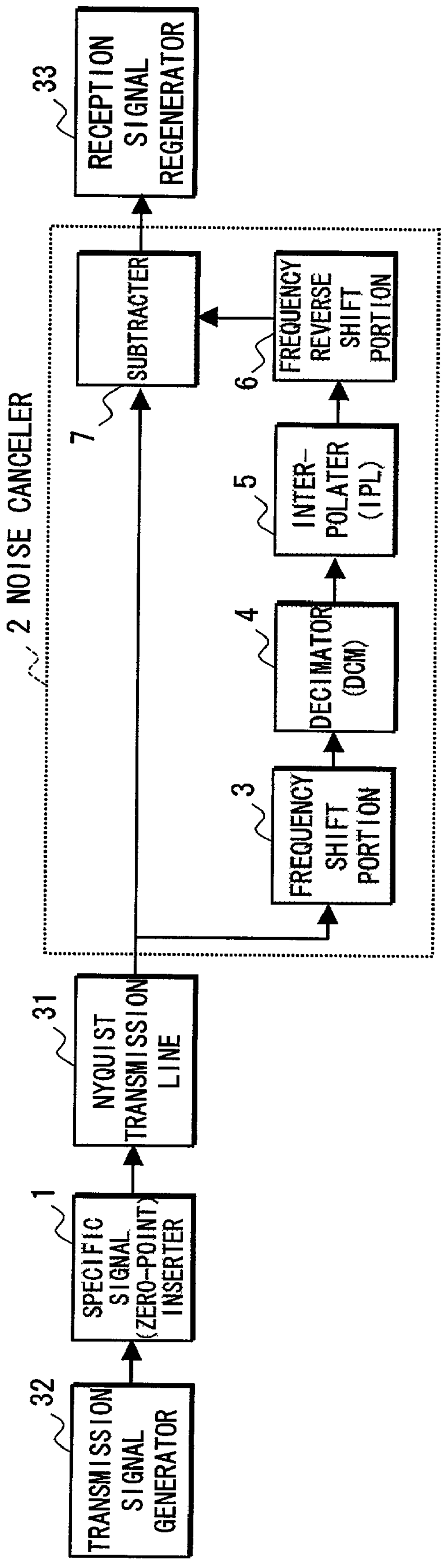

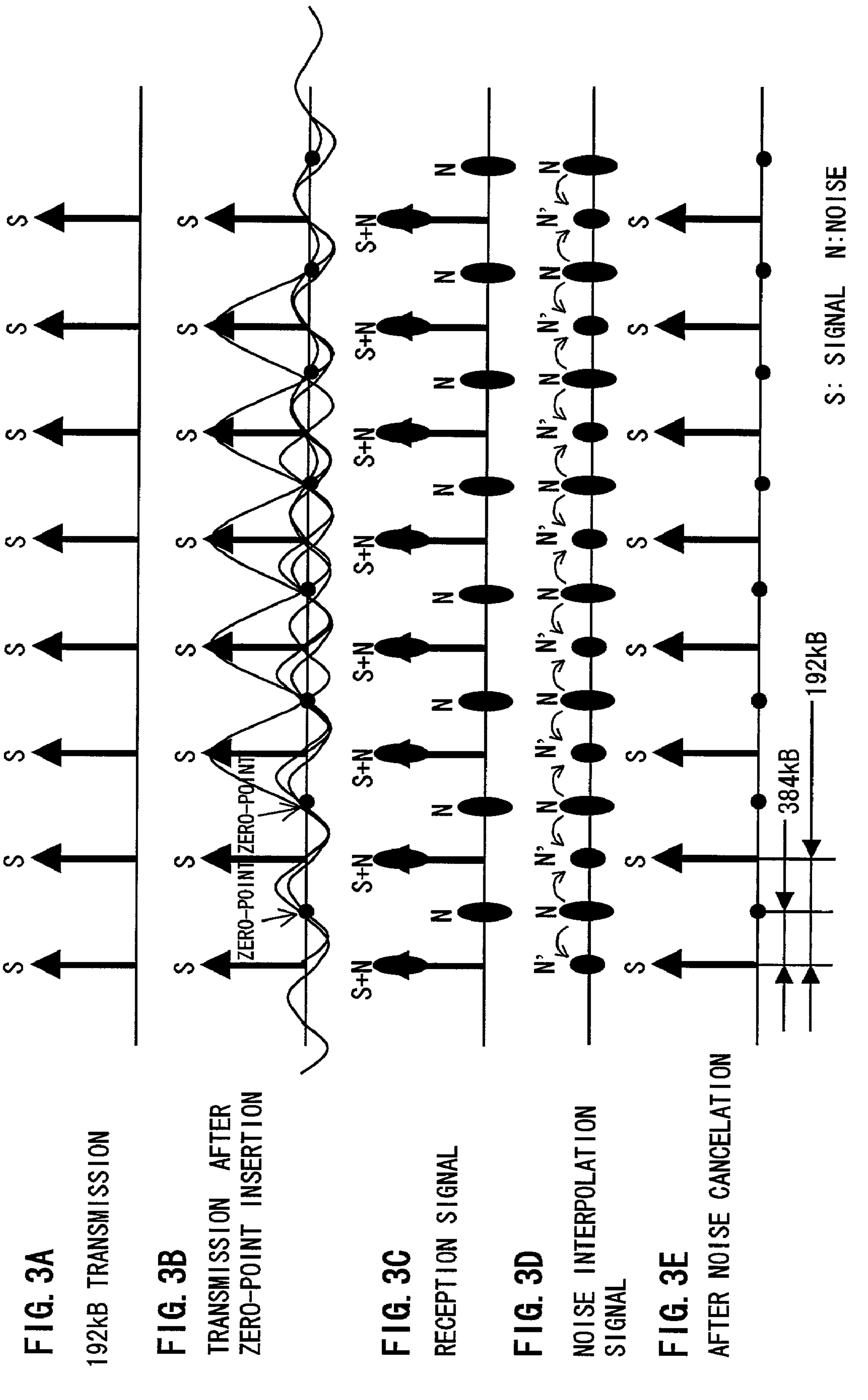
FIG. 3A 192kB TRANSMISSION
FIG. 3B TRANSMISSION AFTER ZERO-POINT INSERTION
FIG. 3C RECEPTION SIGNAL
FIG. 3D NOISE INTERPOLATION SIGNAL
FIG. 3E AFTER NOISE CANCELATION FIG. 4A SIGNAL POINT ON TRANSMISSION SIDE (UPON 192kB TRANSMISSION AFTER GENERATING TRANSMISSION SIGNAL POINT)
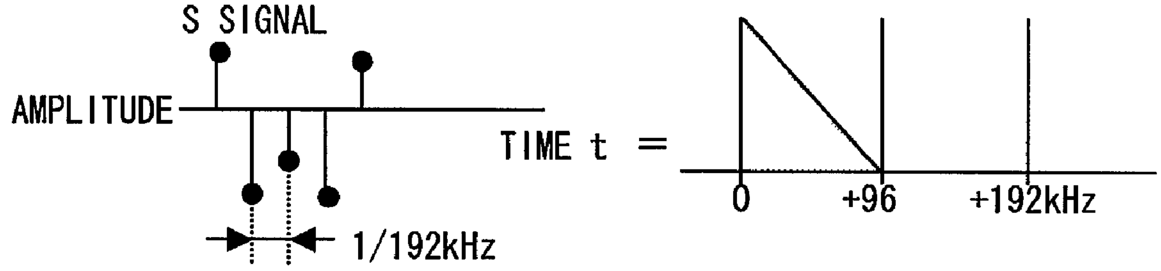
FIG. 4B SIGNAL POINT ON TRANSMISSION SIDE (384kB AFTER ZERO-POINT INSERTION)
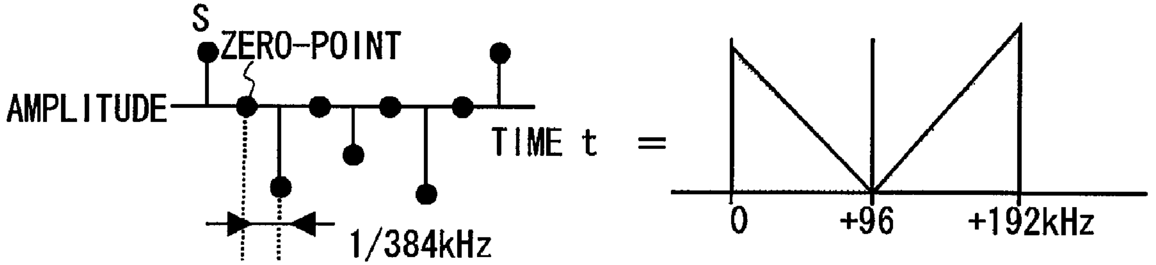
FIG. 4C SIGNAL POINT ON RECEPTION SIDE (384kB AFTER NYQUIST TRANSMISSION LINE)
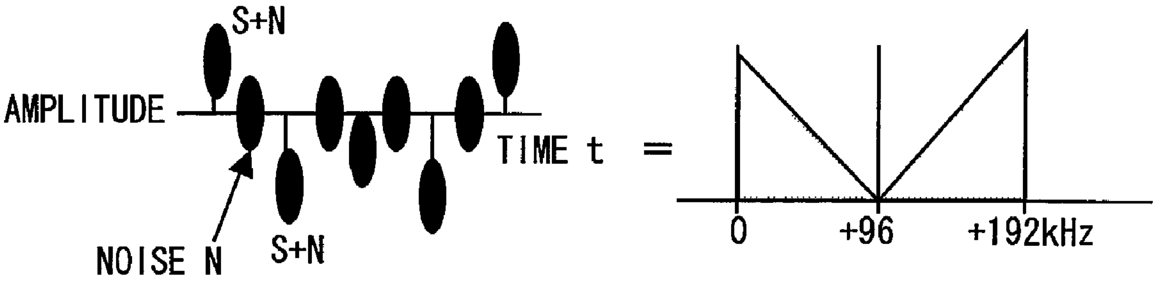

SAMPLE VALUE & SPECTRUM OF SIGNAL u(n)

SAMPLE VALUE & SPECTRUM OF SIGNAL t(n)

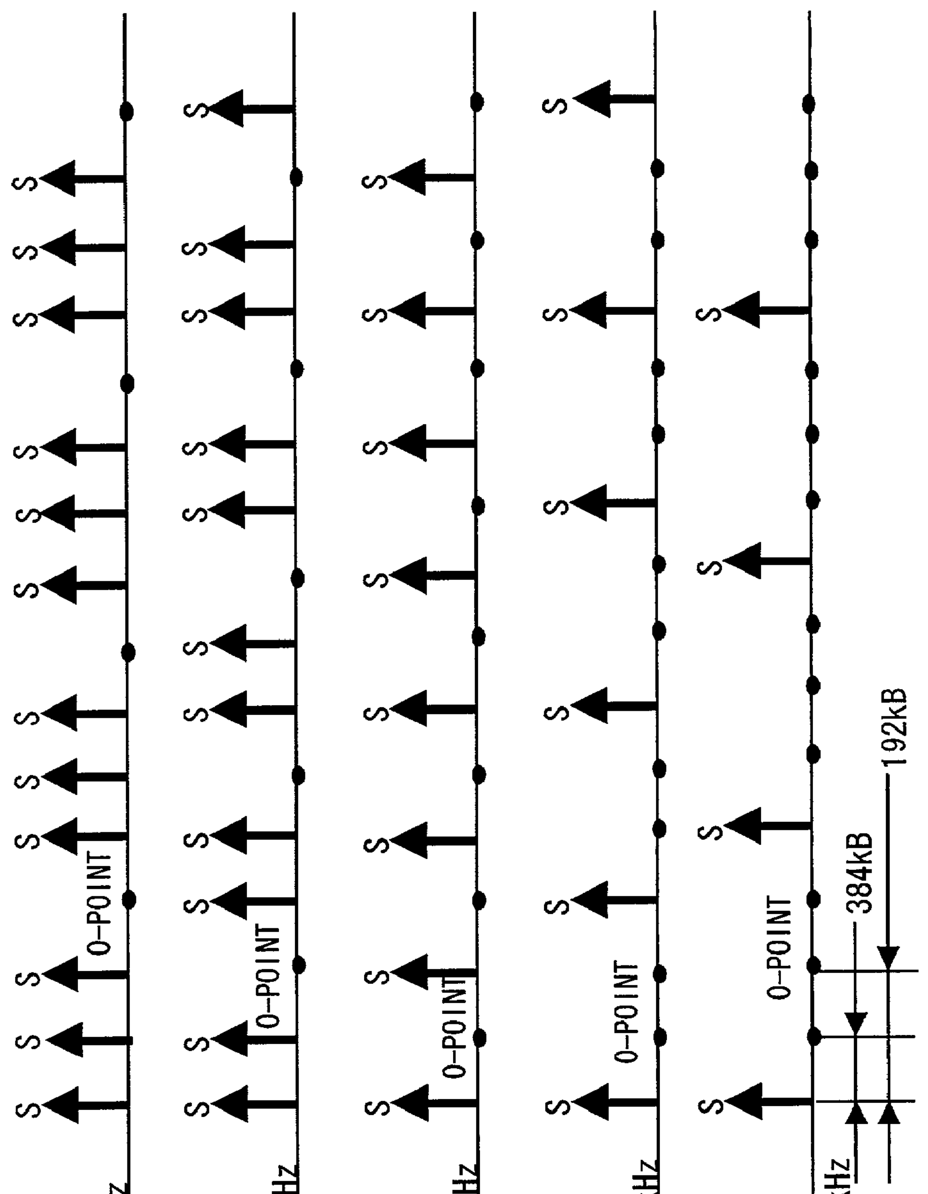

FIG. 8A
ZERO-POINT: INSERTED INTO EVERY 4TH SIGNAL POINT
INTERPOLATED NOISE BANDWIDTH: 96kHz

FIG. 8B
ZERO-POINT: INSERTED INTO EVERY 3RD SIGNAL POINT
INTERPOLATED NOISE BANDWIDTH: 128kHz

FIG. 8C
ZERO-POINT: INSERTED INTO EVERY OTHER SIGNAL POINT
INTERPOLATED NOISE BANDWIDTH: 192kHz

FIG. 8D
ZERO-POINT: 2 ZERO-POINTS INSERTED BETWEEN SIGNAL POINTS
INTERPOLATED NOISE BANDWIDTH: 256kHz

FIG. 8E
ZERO-POINT: 3 ZERO-POINTS INSERTED BETWEEN SIGNAL POINTS
INTERPOLATED NOISE BANDWIDTH: 288kHz

FIG. 9A LOW-PASS FILTER
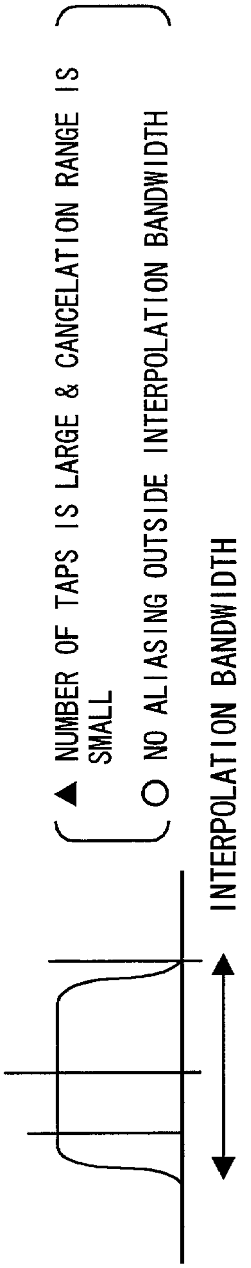
FIG. 9B COS-SQUARED FILTER
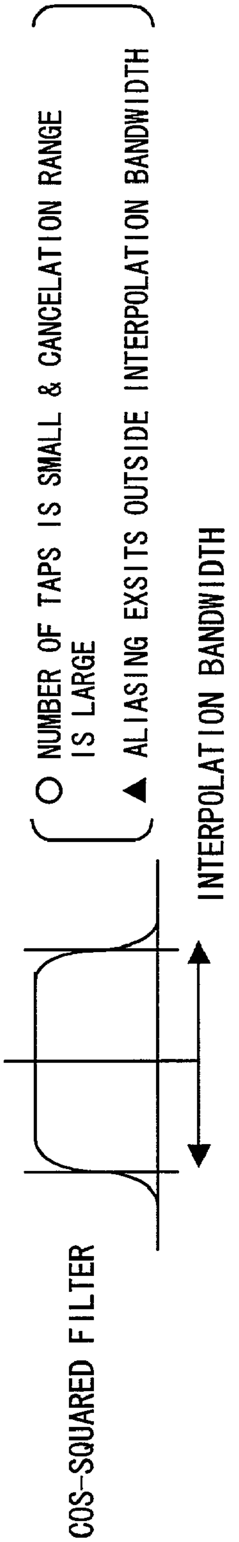
FIG. 9C COS FILTER
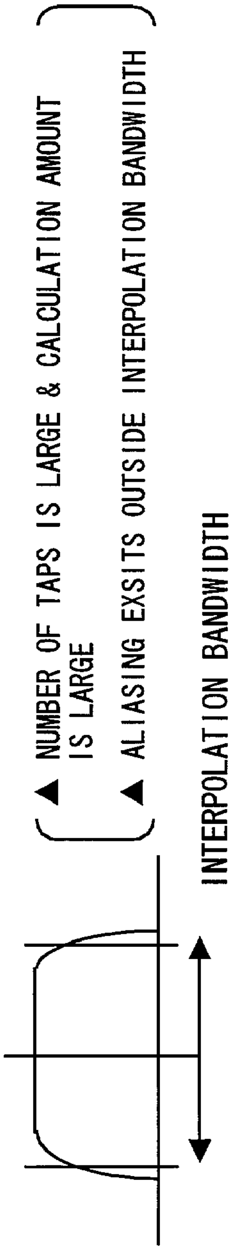

(LINE SPECTRUM IN THE CENTER OF THE PHOTO IS ZERO-POINT SIGNAL OF 192kHz)

FIG. 18A TRANSMISSION BANDWIDTH (LINE SIGNAL)

FIG. 18B BASEBAND (ROF OUTPUT)

FIG. 18C AFTER FREQUENCY SHIFT (AFTER +138kHz SHIFT)

PRIOR ART

NOISE CANCELING METHOD AND APPARATUS

BACKGROUND OF THE INVENTION

1. Field of the Invention

The present invention relates to a noise canceling method and an apparatus therefor, and in particular to a noise canceling method and an apparatus therefor for faithfully taking out a signal buried in a noise.

Such a noise canceling method and an apparatus therefor has become remarkably necessary in various industrial fields as described in the following.

Power-line carrier modem field which attempts to realize a data transmission at a high speed under circumstances with many noises such as in a power-line carrier;

CATV modem, ADSL modem, VDSL modem, 2.4 G wireless LAN, wireless transmission field, optical transmission field, and the like;

Magnetic disk or optical disk which attempts to realize a high recording density by taking out such a signal as is buried in the noise due to the transmission rate accelerated;

Semiconductor of accelerated multi valued transmission technology;

Voice recognition, image compression, demodulation of bar code scanner, and the like under noisy circumstances.

Hereinafter, the presence of such a noise will be described by taking a power-line carrier modem as an example, while the same applies to the other fields as mentioned above.

In a power system shown in FIG. 20, power in a distribution substation 100 is firstly supplied to a pole transformer 103 through a 6.6 KV high voltage distribution line 102, and is further supplied to a home 105 through a 100 V/200 V low voltage distribution line 104.

Upon performing a power-line carrier communication, an optical fiber (not shown) is set up parallel with the high voltage distribution line 102 between an access node 101 in the distribution substation 100 and a modem set up in the pole transformer. Through the optical fiber, the communication between the modem in the pole transformer 103 and the modem inserted into the convenience outlet connected to an interior distribution line 106 in the home 105 is performed through the 100 V/200 V low voltage distribution line 104.

In this case, as shown in FIGS. 21A–21C, the low voltage distribution line 104 looks like an inductor of 1 μH/m, as shown in FIG. 21B, for a spectrum of a transmission signal TX shown in FIG. 21A, and looks like an inductor of 150 μH if the line length is assumed to be 150 m.

Also, a service wire 107 connected to the low voltage distribution line 104 looks like a capacitor of 75 pF/m, and looks like a capacitor of 0.1125 μF if a 50 m service wire is assumed to be connected to the home 105. Not only the service wire, but also various household electric appliances in the home 105 look like a capacitive load (see FIG. 21B), since the capacitors for canceling the noise are connected to AC 100 V.

Consequently, the portion between the utility pole where the pole transformer 103 is placed and the convenience outlets in the home looks like a low-pass filter (LPF), as shown in FIG. 21B, and a reception signal RX greatly attenuates in a high frequency band, as shown in FIG. 21C. Therefore, when arriving at the terminal side, the high frequency band signal is buried in a noise N in the worst case.

On the other hand, although the loss in the low frequency band is not so large compared with the high frequency band, random noises (white noises) from the household electric appliances such as inverter appliances are extremely large. Therefore, the low frequency band signals are also buried in the noise N as shown in FIG. 21C, and the high-speed data communication can not be put into practice, so that the so has been demanded for a long time.

2. Description of the Related Art

Hereinafter, the prior art technologies for which such solutions have been proposed will be described over three generations.

<1st Generation>

FM modulation method, FSK modulation method, PSK modulation method, and the like said to be resistive to the noise were adopted as a modulation method of a power-line carrier modem. However, since the noise level of the actual power line was high, their practical uses were limited to the applications for a low speed, equal to or less than 1200 bps.

<2nd Generation>

The spread spectrum system was introduced. Since the spread spectrum system was resistive to the noise, it was greatly expected for practical use of the power-line carrier.

However, according to Shannon theory limit, the transmission capacity decreases rapidly when the S/N value is minus or negative (see FIG. 21C) subject to the white noise, and it is theoretically impossible to realize the high-speed transmission. Accordingly, the Shannon limit could not be exceeded, so that the communication of 100 kbps at the maximum could be performed or the communication was disabled in the worst case.

<3rd Generation>

OFDM (Orthogonal Frequency Division Multiplexing) method has appeared. The OFDM method adopts the multi carrier modulation method, and is a technology which avoids the carrier bandwidth with a number of noises without using it. Therefore, a large noise can be avoided, resulting in a prospect of realizing enhanced speed.

However, the inverter built-in rate of the household electric appliances forming the main sources of the noises has been increasing, and the reduction in the high frequency band accompanied with the capacitive load has been also increasing. As a result, although it has been possible to perform a low speed communication depending on circumstances in the prior art technology, it has been impossible to realize a higher speed communication of several Mbps.

Thus, building the inverters in the household electric appliances is a great trend, so that the noise due to the inverters built in the household electric appliances has a tendency to increase more and more hereafter. Also, with the increase of the noise, the capacitive load has a tendency to increase for a noise preventive measure.

Under such circumstances, the idea of avoiding the noise like the solution of the 3rd generation is not enough for the trend. Rather, for the solution of the 4th generation, the attempt of positively facing the noise to cancel the noise, and realize a high-speed data communication is important.

As shown in FIG. 21C, although the noises are little in the high frequency band, the reception signal greatly attenuates by the capacitive load, and becomes lower than the noise level. Although the attenuation of the reception signal is not so large in the low frequency band, the S/N value is still minus due to the noise from the household electric appliances.

SUMMARY OF THE INVENTION

It is accordingly an object of the present invention to provide a method and an apparatus for realizing a high-speed transmission by canceling a noise in a low frequency where signal attenuation is little even if in a state where an S/N value is minus and by regenerating a buried reception signal.

Even though a low frequency band (noise component N1, signal component S1) where the level of a noise N is high, as shown in FIG. 1A, is cut to transmit data only by using a high frequency band, the S/N value remains minus.

On the other hand, if a noise in a power line is carefully observed in FIG. 21C and FIG. 1A, it is seen that there are a number of noises emphasized in a low frequency band, in which if being microscopically observed they are white noises while if being macroscopically observed (from the entire frequency bandwidth), they are colored noises. Namely, if being observed at any narrow bandwidth over the entire frequency band, they are the same white noises.

Accordingly, in the present invention, the colored noise observed macroscopically in that way is noticed, and as shown in FIG. 1B, the noise component N1 dominant in the low frequency band is positively canceled to shift the S/N value to plus, so that the extraction of a reception signal S buried in the low frequency band, with a comparatively high level, is attempted.

Therefore, the prevent invention realizes a noise canceling method and an apparatus therefor for interpolating a noise component based on a signal (hereinafter, occasionally referred to as specific signal) in which a time, an amplitude, and a phase are specified which is included into a received signal, and for canceling the noise component from the received signal.

Also, the present invention realizes a noise canceling method and an apparatus therefor for periodically inserting a zero-point into a signal on a transmission side, for interpolating a noise component by using the zero-point on a reception side, and for subtracting the noise component from a received signal.

Hereinafter, such a noise canceling method and an apparatus therefor according to the present invention will be described referring to the figures.

FIG. 2A shows a prior art transmission/reception system of a signal, in which a transmission signal from a transmission signal generator 32 is sent to a reception signal regenerator 33 through a Nyquist transmission line 31 as a transparent transmission line.

In the present invention, as shown in FIG. 2B, an inserter (inserting portion) 1 of a specific signal or a zero-point (hereinafter, generally referred to as zero-point) is provided between the transmission signal generator 32 and the Nyquist transmission line 31 in such a transmission/reception system, and a noise canceler 2 is provided between the Nyquist transmission line 31 and the reception signal regenerator 33. It is to be noted that the noise canceler 2 is composed of a frequency shift portion 3, a decimator (DCM) (decimating portion) 4, an interpolater (IPL) (interpolating portion) 5, a frequency reverse shift portion 6, and a subtracter (subtracting portion) 7, as described later.

First of all, the symbol rate of the transmission signal generated by the transmission signal generator 32 is assumed to be e.g. 192 kB as shown in FIG. 3A. If such a transmission signal is provided to the zero-point inserter 1, the zero-point inserter 1 inserts the zero-point, as shown in FIG. 3B, into the transmission signal of FIG. 3A to be transmitted to the Nyquist transmission line 31. If the signal S is also transmitted at the same rate, the transmission rate assumes 384 kB.

The reception side, as shown in FIG. 3C, receives the reception signal S and the zero-point on which the noise N of the transmission line 31 is respectively put.

The noise canceler 2 cancels the signal S including the noise N (S+N), and leaves only the noise N at the zero-point. Then, as shown in FIG. 3D, a noise interpolation signal N' is generated at each reception signal point from the noises N on both sides.

The noise canceler 2 further subtracts the noise interpolation signal N' shown in FIG. 3D from the reception signal shown in FIG. 3C, so that the noise N assumes N–N' as shown in FIG. 3E. Thus, the signal (corresponding to the transmission signal), having substantially removed therefrom the noise, only composed of the signal component S can be regenerated.

The operation of the noise canceler 2 will now be described in more detail referring to FIGS. 4–6.

The above-mentioned transmission signal is firstly transmitted at the rate of 192 kB as shown in FIG. 4A. The spectrum in this case is shown by the scalar, in which the abscissa denotes frequency bandwidth kHz, in the right of FIG. 4A.

When the zero-points are inserted into such a transmission signal, the zero-points are to be inserted into signal points as shown in FIG. 4B, so that the frequency bandwidth after the insertion assumes 384 kB. In this case, a spectrum is copied around +192 kHz can be obtained.

The reception signal at the time when such a transmission signal into which the zero-points are inserted is transmitted to the reception side assumes the noise components N being overlapped with the signals S and the zero-points respectively, as shown in FIG. 4C. The spectrum in this case is the same as that of the transmission signal shown in FIG. 4B.

The operation at the time when the reception signal is sent to the decimator 4 after being shifted by the frequency shift portion 3 in the noise canceler 2 is shown in FIGS. 5A–5D.

Namely, a sample value and a spectrum of a reception signal S(n) are as shown in FIG. 5A, and the Z transformation A of the signal S(n) is expressed by the following equation:

$$A=S(z)=\Sigma S(n)z^{-n} \qquad \text{Eq.(1)}$$

It is to be noted that the spectrum in the right of FIG. 5A shows that the noises are distributed over 0–$f_s/2$ ($f_s$ is sample frequency) since the noises are added by the transmission line 31.

The Z transformation B of the inversion signal of the reception signal S(n) is expressed by the following equation:

$$B=Z[(-1)^n S(n)]=S(-z) \qquad \text{Eq.(2)}$$

The inverted signal in this case has a coefficient $(-1)^n$ because the inversion is made only to the signal component at the signal point.

The Z transformation C of a signal t(n) obtained after adding the inversion signal $(-1)^n$*S(n) to the reception signal S(n) shown in FIG. 5A is given by the following equation:

$$C=Z[t(n)]=T(z)=(1/2)*[S(z)+S(-z)] \qquad \text{Eq. (3)}$$

Namely, the amplitude at the signal point becomes zero, so that not only the signal component S but also the noise component N overlapped with the signal S is removed. The signal t(n) in which t(1), t(3), . . . ,=0 is expressed by the following equation:

$$T(z)=\Sigma t(2n)*Z^{-2n} \quad \text{Eq.(4)}$$

A signal D after the signal point of the signal t(n) obtained in this way shown in FIG. 5C is decimated is expressed by the following equation:

$$D=u(n)=T(z^{1/2}) \quad \text{Eq. (5)}$$

Since the transmission rate falls to 192 kB in this case, the spectrum is aliased or folded as shown in FIG. 5D.

A final signal E=U(z) is given by the following equation:

$$E=[S(z^{1/2})+S(-z^{1/2})]/2 \quad \text{Eq. (6)}$$

The thus obtained decimation signal u(n) provided to the interpolater 5 shown in FIG. 2B would exhibit the operations shown in FIGS. 6A and 6B.

Namely, the signal u(n) from the decimator 4 is only composed of the noise component having the sample value and the spectrum shown in FIG. 6A. The signal t(n) with the zero-point inserted into the noise component has a sample value and a spectrum such as shown in FIG. 6B, and the Z transformation A is expressed by the following equation:

$$A=(z)=\Sigma t(n)z^{-n} \quad \text{Eq. (7)}$$

Since t(1), t(3), . . . ,=0, $$A=\Sigma t(2n)z^{-n}=u(n)z^{-2n} \quad \text{Eq. (8)}$$

Then, the following equation is obtained:

$$T(z)=U(z^2) \quad \text{Eq. (9)}$$

If the zero-points are interpolated with the noise components N on their both sides in the signal T(z), the signal has the same transmission rate as the reception signal S(n) shown in FIG. 5A and has only the noise component.

Accordingly, by subtracting the interpolated signal from the reception signal S(n), the transmission signal into which the zero-points are inserted shown in FIG. 4B can be obtained.

It is to be noted that in order to obtain the transmission signal shown in FIG. 4A the zero-points only have to be decimated.

While in the above description, how the transmission signal is regenerated on the reception side has been mentioned, FIG. 7 shows how the noise component is canceled by paying attention only to the noise component.

Namely, when the transmission signal has the transmission bandwidth of 192 kB (±96 kB), and the zero-points are inserted thereto, the bandwidth is doubled, so that the copied component is generated to be sent to the Nyquist transmission line 31.

At the noise canceler 2, as shown in a noise distribution characteristic ①, the noise distribution firstly extends over ±192 kHz. The noise level is high especially in the left half of the frequency bandwidth of −192–0 kHz as shown in FIGS. 1A and 1B, and is low in the frequency bandwidth of 0–+192 kHz.

When the frequency shift portion 3 shifts the frequency by +96 kHz in this state, a noise component A+B will be shifted by +96 kHz for the noise characteristic ①, as shown in a noise characteristic ②. With this shifting, a noise component D in the noise characteristic ① will be aliased to −192 kHz–96 kHz. Thus, the noise bandwidth for which the interpolation (interpolated prediction) is desired to be performed is shifted to the interpolation bandwidth, thereby more effectively canceling the noise.

It is to be noted that the shift amount of +96 kHz is only one example for convenience' sake description.

If the decimation operation is performed by the decimator 5 in this state, the frequency becomes half. Therefore, the noise component A is aliased in +96–+192 kHz, the noise component B is aliased to −192–−96 kHz, the noise component C is aliased to −96–0 kHz, and the noise component D is aliased to 0–+96 kHz. The bandwidth where the aliased component becomes the least is selected here.

If the interpolater 5 interpolates the zero-points and performs a filter canceling of the noise components A+C and B+D on both sides, the noise components A+C and B+D only between −96–+96 kHz remain as shown in a noise characteristic ④.

If the interpolated noise components are shifted in the reverse direction to the above-mentioned frequency shift, that is, by −96 kHz, the noise components A+C and B+D only between −192–0 kHz remain as shown in a noise characteristic ⑤.

Accordingly, the subtracter 7 subtracts such noise components from the entire noise components shown in the characteristic ① thereby completely canceling the noise components A and B between −192–0 kHz as shown in a characteristic ⑥. It is to be noted that although the noise components C and D remain, their noise level is low, as shown in FIG. 1B, so that the S/N value is not greatly influenced.

The reception signal from which the noise is canceled in that way is regenerated substantially corresponding to the transmission signal.

It is to be noted that the reason for performing the frequency shift as mentioned above is because the interpolation bandwidth is set e.g. to the bandwidth where the most noises exist (in low frequency band in this example) to select the high frequency band with less noise for the aliased frequency bandwidth.

While in the above-mentioned FIGS. 3 and 4, a case where one zero-point is inserted between the signal points has been mentioned, FIGS. 8A–8E show various patterns of the zero-point insertion.

Namely, FIG. 8A shows the case where the zero-points are inserted into every 4th signal S, whereby the interpolated noise bandwidth assumes 96 kHz.

Also, FIG. 8B shows a case where the zero-points are inserted into every 3rd signal S, whereby the interpolated noise bandwidth assumes 128 kHz.

FIG. 8C shows a case where the zero-points are inserted into every other signal in the same way as the above-mentioned example, whereby the interpolated noise bandwidth assumes 192 kHz.

FIG. 8D shows an example in which two zero-points are inserted between the signals S, whereby the interpolated noise bandwidth assumes 256 kHz.

Furthermore, FIG. 8E shows an example in which three zero-points are inserted between signals S, whereby the interpolated noise bandwidth assumes 288 kHz.

By increasing the number of the zero-point as shown in FIGS. 8D and 8E, the noise canceling over a wider bandwidth is made possible. Although the data transmission rate may decrease in some cases in exchange for the increase of the noise proof, it becomes possible to withstand worse circumstances.

Since an intersymbol interference increases upon passing the narrow bandwidth for example, the noise is canceled while the signal itself is partially canceled. In such a case, the system parameter may be optimized in order to effectively cancel the noise without decreasing the entire rate and attenuating the signal. Alternatively, an equalizer may be inserted at the former stage of the noise canceler.

Also, if the signal quality is judged on the reception side, the inserted number of the zero-point is determined according to the decision result, and the number is notified to the transmission side, it becomes possible to adaptively change the zero-point inserted number.

Moreover, the zero-point insertion may be performed on the transmission side by using e.g. the PN (pseudo random) system. Thus, the reception side can interpolate the random noise by the PN system.

As an example of the PN system, the followings can be given:

15 chips:111101011001000

31 chips:1111100110100100001010111011000

In this case, it is also possible to sequentially insert the zero-points with the time axis being shifted like the MUSE system as performed by the image compression method.

There are various other methods of the zero-point insertion. The optimization may be performed according to the system characteristic.

The interpolation 5 shown in FIG. 2B can perform the interpolating operation by using various filter characteristics as shown in FIGS. 9A–9C.

Namely, in the low-pass filter shown in FIG. 9A, the interpolation bandwidth is made a transmission bandwidth. There is no aliasing waveform outside the interpolation bandwidth in this case. However, being composed of a transversal filter or the like, the filter has a characteristic that the number of taps is large and the cancelation range is small.

Moreover, in case of a cos-squired filter shown in FIG. 9B, the interpolation bandwidth is made the Nyquist bandwidth, and the filter has a characteristic that the number of taps is small, the cancelation range is large, but the aliasing waveform occurs outside the interpolated bandwidth.

Furthermore, in case of a cos filter shown in FIG. 9C, the interpolation bandwidth is also made the Nyquist bandwidth, and the filter has a characteristic that the number of taps is large, the calculation amount is much, and the aliasing waveform occurs outside the interpolation bandwidth.

Moreover, in the present invention, the above-mentioned frequency shift amount may be automatically determined for the frequency bandwidth by detecting the frequency bandwidth in which the noise frequency component of the received signal is large.

Furthermore, an automatic equalizing process for removing the intersymbol interference at the former or latter stage of the noise cancelation may be performed.

BRIEF DESCRIPTION OF THE DRAWINGS

FIGS. 2A and 2B are block diagrams comparing a basic arrangement of the present invention with a prior art example;

FIGS. 3A–3E are diagrams showing a schematic operation of the present invention;

FIGS. 4A–4C are diagrams showing in detail an operation on a transmission side of the present invention;

FIGS. 8A–8E are diagrams showing various states of zero-point insertion by the present invention;

FIGS. 9A–9C are diagrams showing interpolation filter examples used in the present invention;

Throughout the figures, like reference numerals indicate like or corresponding components.

DESCRIPTION OF THE EMBODIMENTS

Figures 10A, 10B:
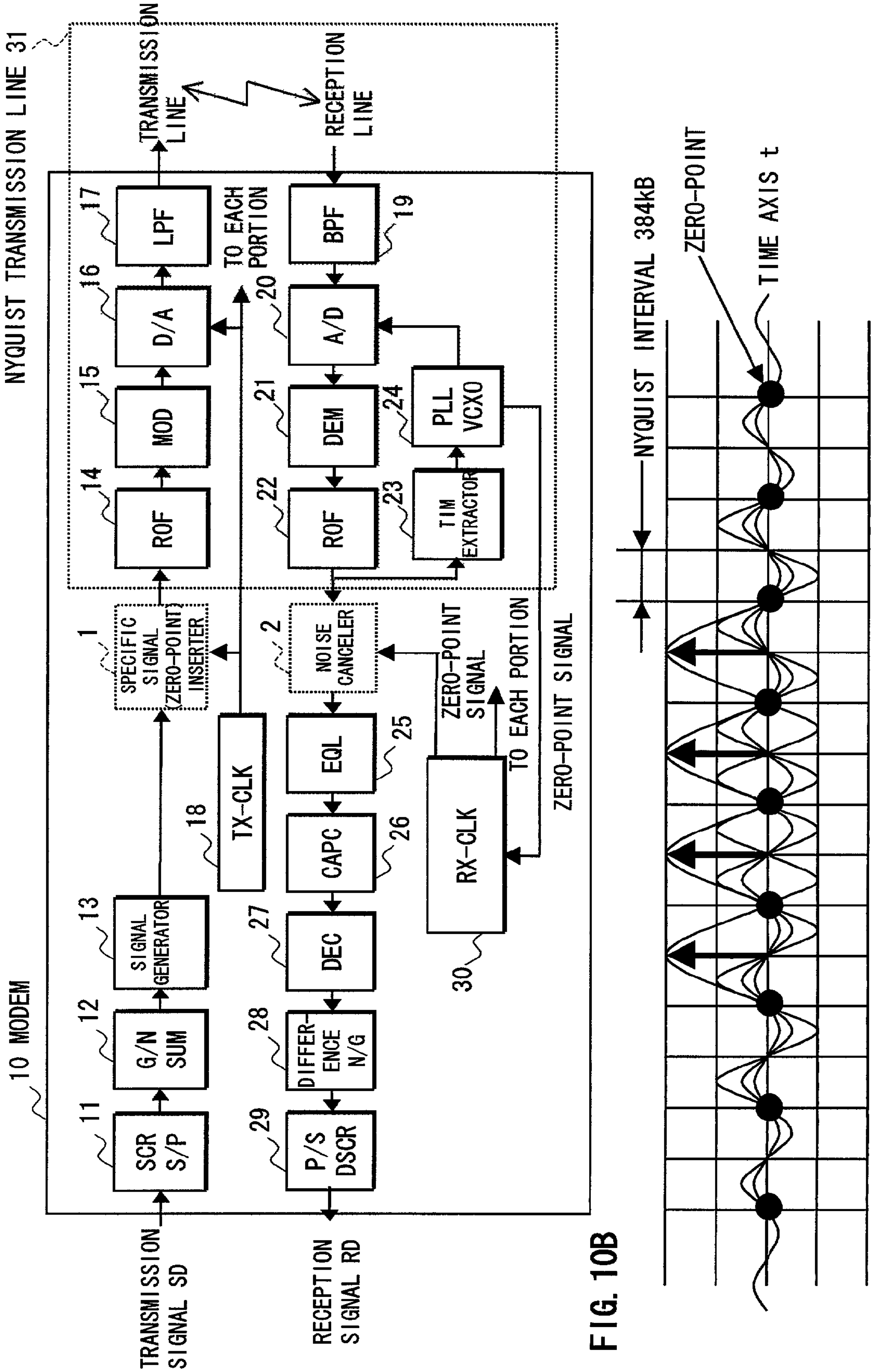
FIGS. 10A and 10B are block diagrams showing an embodiment in which the present invention is applied to a modem.

FIGS. 10A and 10B show an embodiment of a modem using a noise canceling method and an apparatus therefor according to the present invention.

Namely, a scramble process is performed to a transmission signal SD by a scrambler (SCR) 11, and a serial signal is converted into a parallel signal. The parallel signal is converted from a Gray code (G) of which the transmission signal is originally formed into a Natural code (N) by a vector sum circuit 12. After a vector sum calculation is performed corresponding to a vector difference circuit 28 for detecting the phase at the reception side, a signal generator 13 transmits the transmission signal as shown in FIGS. 3A and 4A.

The zero-points are inserted into the transmission signal by the zero-point inserter 1 according to the present invention, and the waveform is shaped by a roll-off filter (ROF) 14.

The output signal of the roll-off filter 14 is modulated by a modulation circuit (MOD) 15 and is further converted from the digital signal into the analog signal by a D/A conversion circuit 16. Then, a low-pass filter (LPF) 17 extracts a signal only in a low frequency bandwidth including a frequency bandwidth (10 kHz–450 kHz) of a power carrier wave to be transmitted to the transmission line.

When the transmission signal from the transmission line is received through the reception line, only a predetermined frequency bandwidth component (10–450 kHz for a power carrier modem) is firstly extracted by a band-pass filter (BPF) 19, and then the analog signal is restored to the digital signal by an A/D conversion circuit 20.

The analog signal expressed in the digital form is demodulated into the baseband signal by a demodulation circuit (DEM) 21, so that the waveform is shaped by a roll-off filter 22.

The output of the roll-off filter 22 is sent to a timing extractor 23 and a VCXO type PLL circuit 24, thereby extracting the phase of the zero-point signal and providing a sampling timing signal to the A/D converter 20.

The noise component of the transmission line is canceled by the noise canceler 2 according to the present invention from the output signal of the roll-off filter 22, an intersymbol interference is removed by an equalizer (EQL) 25, and a phase adjustment is performed by a carrier automatic phase controller (CAPC) 26, so that a decision circuit (DEC) 27 further outputs a signal component from which the noise is removed.

A vector difference (error) calculation by the Natural code, opposite to the vector sum circuit 12, is performed by the vector difference circuit 28, and the Natural code is restored to the Gray code, so that the parallel Gray code is converted into a serial signal by a descrambler (DSCR) 29 for the descramble process to be outputted as a reception signal RD.

In addition, a transmission clock generation circuit (TX-CLK) 18 provides a transmission clock to the zero-point inserter 1 and the D/A converter 16, and distributes the same to other portions. Also, on the reception side, a reception clock generation circuit (RX-CLK) 30 extracts the reception clock to be provided to the noise canceler 2 and the portions of the receiver.

It is to be noted that the reception clock generation circuit 30 only passes the zero-point signal extracted from the PLL circuit 24. Also, the zero-point signal is a mere symbol timing signal in the prior art example.

Figures 1A, 1B:
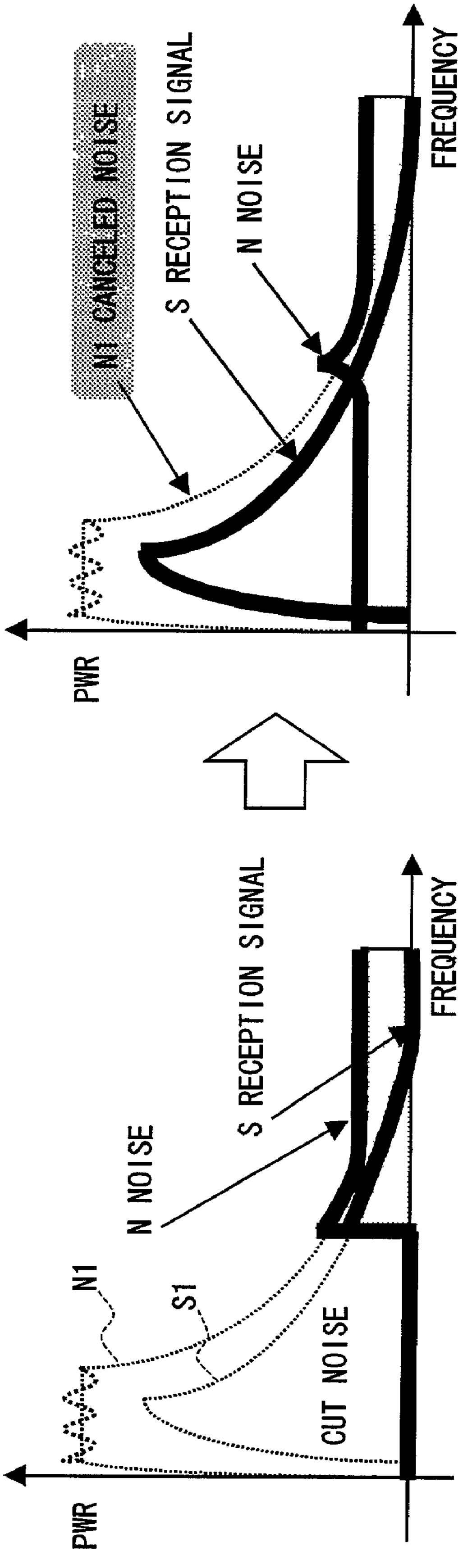
FIGS. 1A and 1B are graphs for illustrating a basic principle of a noise canceling method and an apparatus therefor according to the present invention.

Also, the hatched portion of FIG. 10A corresponds to a Nyquist transmission line 31 as a transparent transmission line. The Nyquist transmission line, as shown in FIG. 1B, transmits signals with the interval of the transmission signal points being the Nyquist interval (384 kB).

Figure 11:
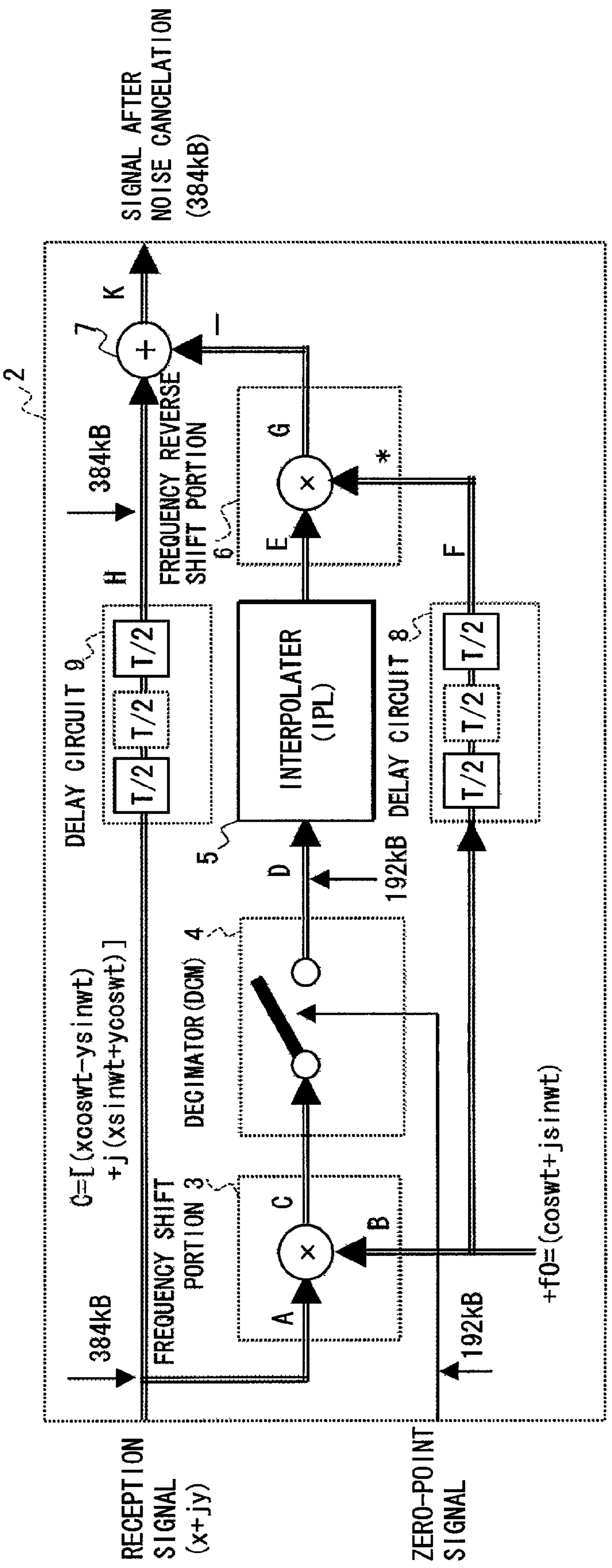
FIG. 11 is a block diagram showing an embodiment of a noise canceler used in the present invention.

FIG. 11 shows an embodiment of a noise canceler 2 shown in FIG. 10A, which corresponds to the noise canceler 2 shown in FIG. 2B.

Namely, a received signal A (384 kB) is outputted as a signal C whose frequency is shifted by a desired rotation vector signal B by the frequency shift portion 3.

Figures 5A, 5B, 5C, 5D:
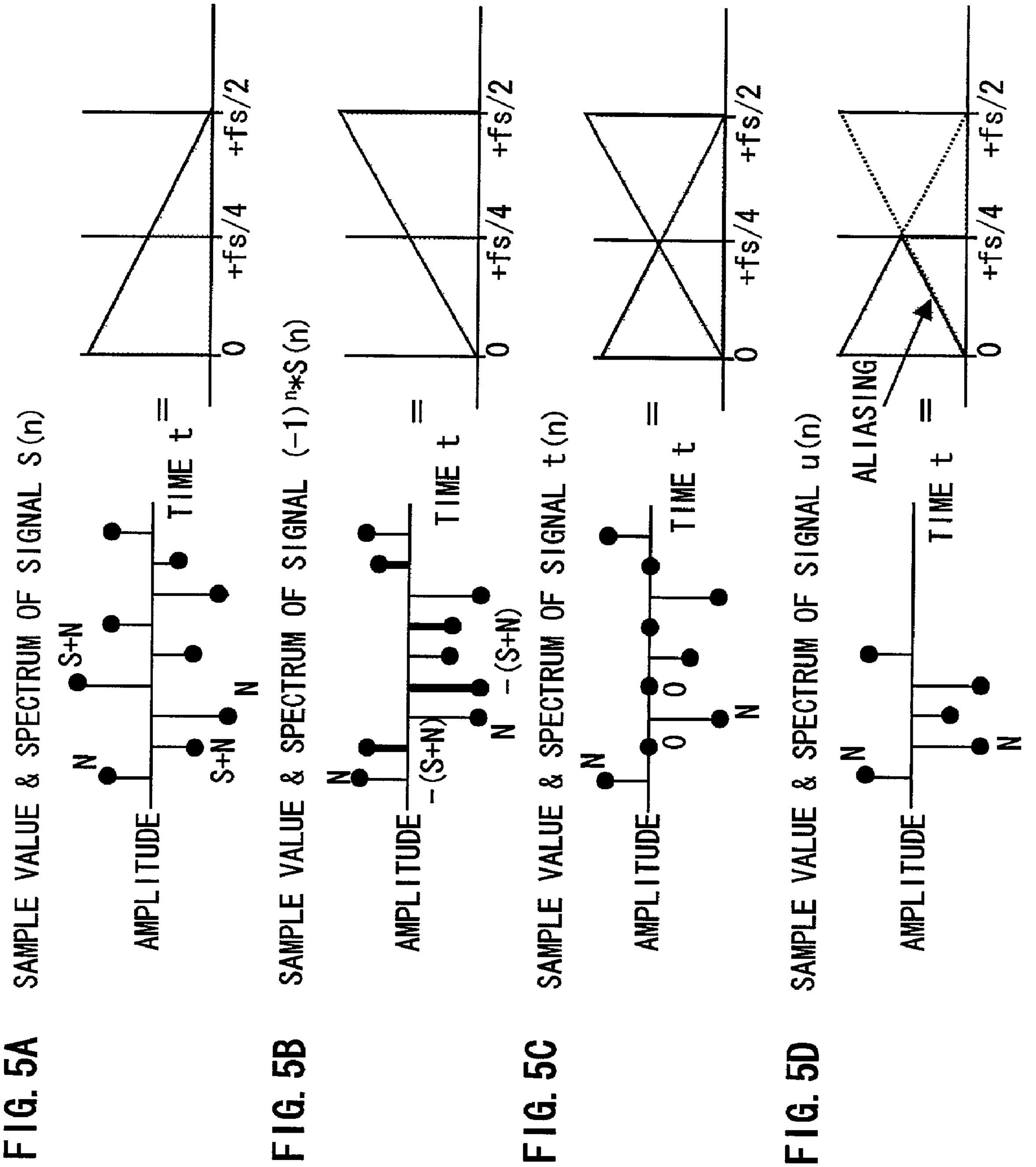
FIGS. 5A–5D are diagrams illustrating a decimating operation of the present invention.

The signal C is sent to the decimator 4, where the signal is converted into a signal D (192 kB) having only the noise component shown in FIG. 5D, based on the zero-point signal (192 kB) extracted from the PLL circuit 24 shown in FIG. 10A.

The signal D is sent to the interpolater 5 to be outputted as a signal E (384 kB) interpolated by the filter process. Since the signal E is sent to the frequency reverse shift portion 6 and shifted toward the reverse direction to the rotation vector signal B used by the frequency shift portion 3, the signal is rotated in the reverse direction by a signal F composing a conjugated complex number with the signal B to be outputted as a signal G. It is to be noted that a delay circuit 8 is provided on the course in order that the signal F is adjusted to the timing of the output signal of the interpolater 5.

The output signal G of the frequency reverse shift portion 6 is subtracted from the received signal A by the subtracter 7 to assume an output signal K. It is to be noted that a delay circuit 9 is also provided to the received signal A in order to adjust the timing to the output signal of the interpolater 5 in this case.

Thus, the signal K that is the received signal A from which the noise component is canceled is outputted.

Figure 12:
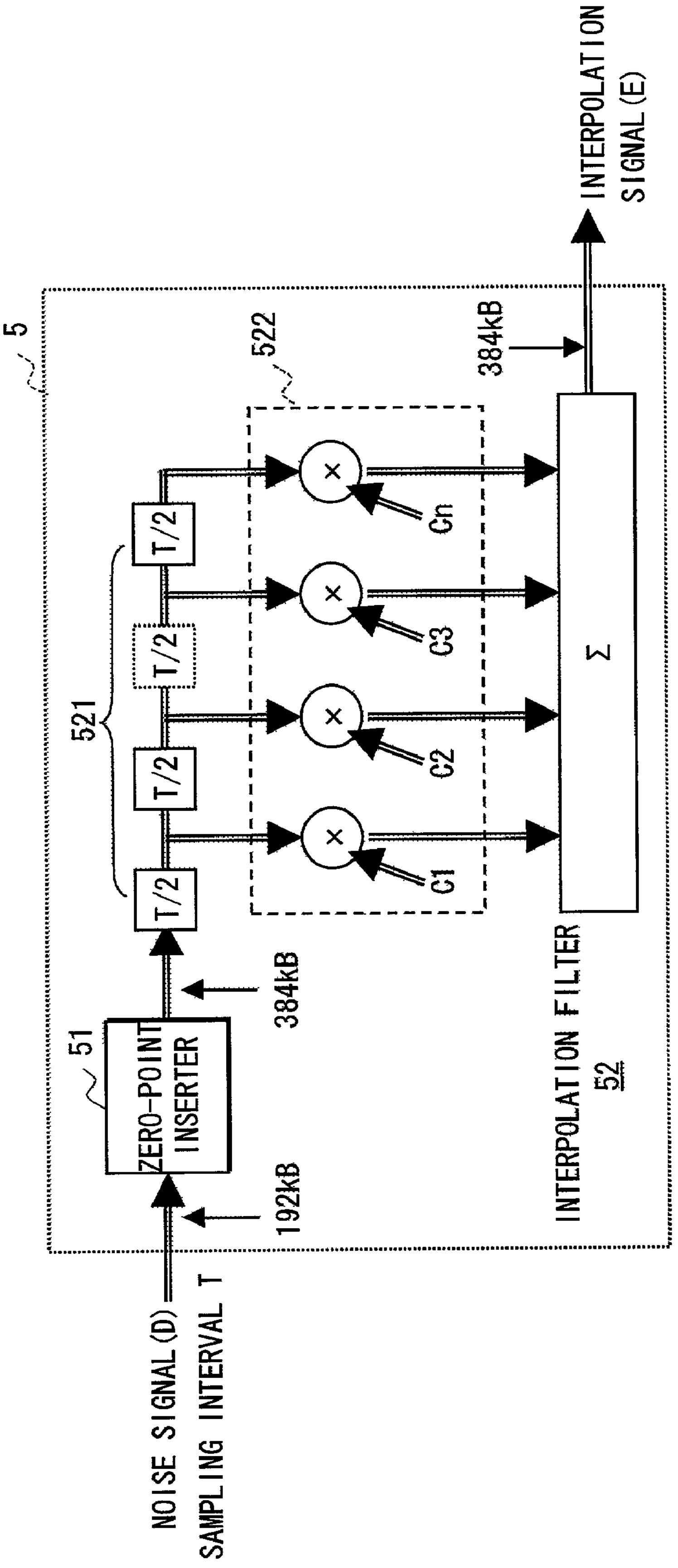
FIG. 12 is a block diagram showing an embodiment of an interpolater used in the present invention.

FIG. 12 shows an embodiment of the interpolater 5 shown in FIG. 11, which is composed of a zero-point inserter 51 and an interpolation filter 52.

Figure 6A:
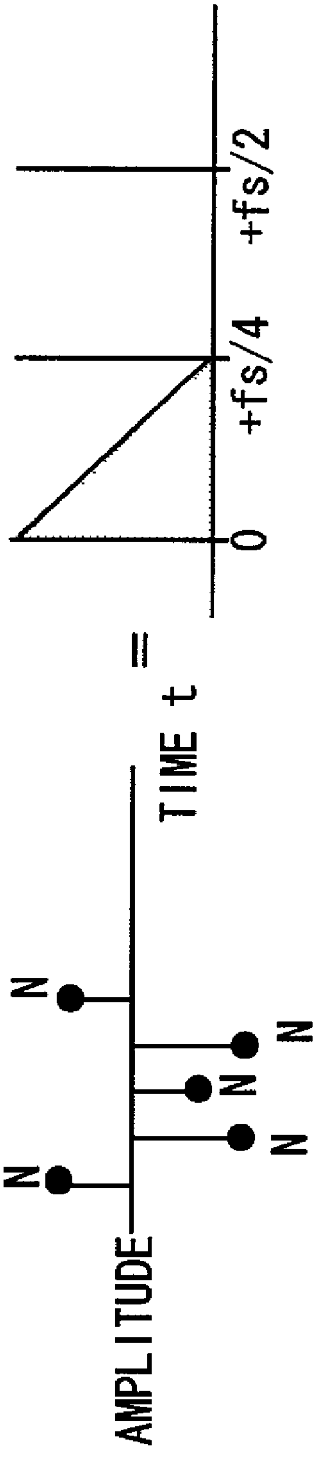
FIGS. 6A and 6B are diagrams illustrating an interpolating operation of the present invention.
Figure 6B:
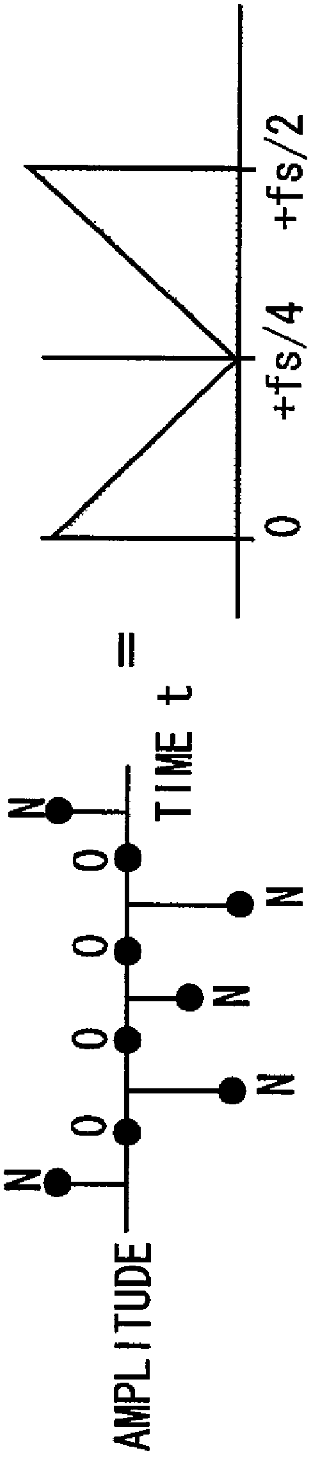

Namely, the zero-point inserter 51 inserts the zero-points between the noises, as shown in FIG. 6B, with respect to the signal D (192 kB) composed of only the noise component outputted from the decimator 4 to be provided to the interpolation filter 52 as a signal of 384 kB transmission bandwidth.

The interpolation filter 52 can be composed of a transversal filter, which can compose various filters as shown in FIGS. 9A–9C with a delay circuit 521 and filter coefficients C1–Cn of a multiplication circuit 522. The interpolation signal E outputted therefrom is outputted as a signal having a certain amplitude where the noise component N' at each zero-point is interpolated by the noise components N on both sides of the zero-point at the signal shown in FIG. 3D.

Figure 13:
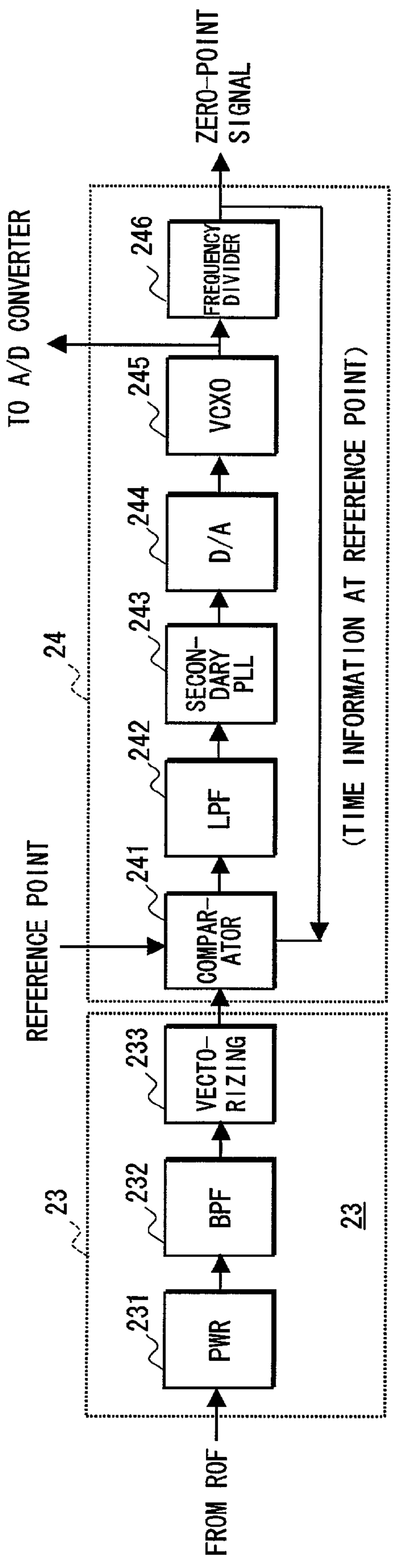
FIG. 13 is a block diagram showing an embodiment of a timing extractor and a VCXO type PLL circuit used in the present invention.

FIG. 13 shows an embodiment of the timing extractor 23 and the VCXO type PLL circuit 24 shown in FIG. 1A. The timing extractor 23 is composed of a power calculation circuit (PWR) 231, a band-pass filter 232, and a vectorizing circuit 233. The PLL circuit 24 is composed of a comparator 241, a low-pass filter 242, a secondary PLL circuit 243, a D/A conversion circuit 244, a VCXO (Voltage Controlled Crystal Oscillator) circuit 245, and a frequency divider 246.

Figure 14:
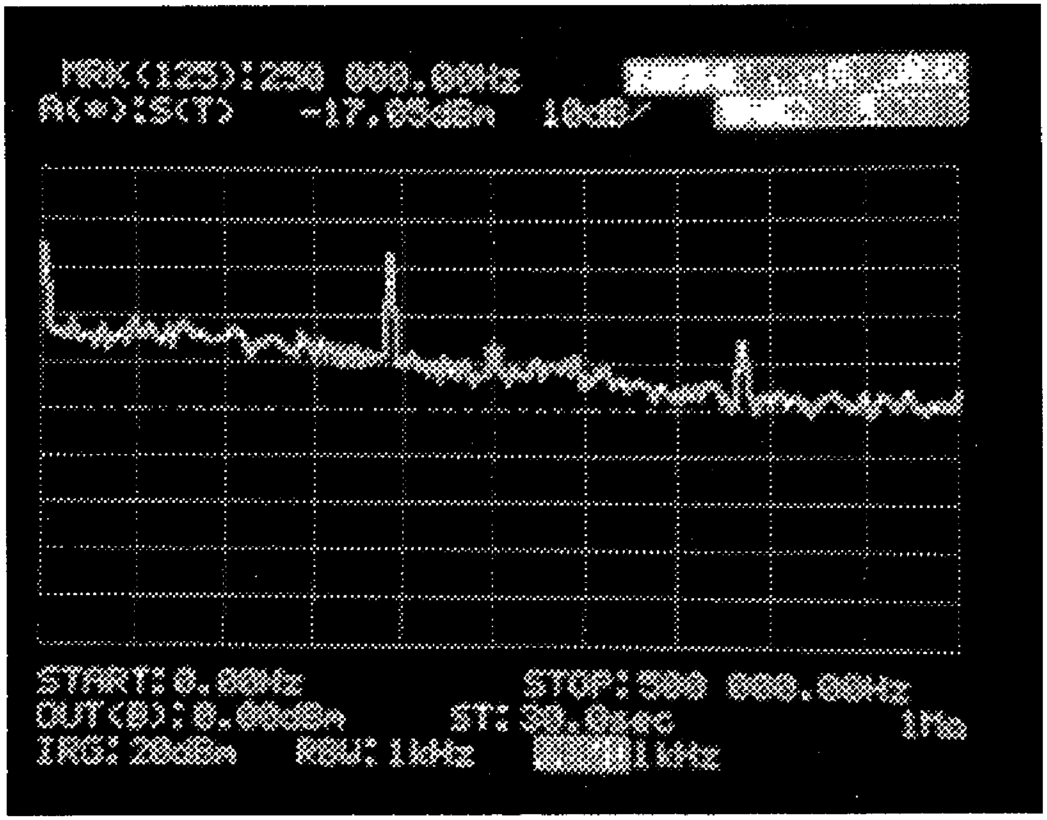
FIG. 14 is a waveform diagram of a timing extractor by the present invention.

Namely, the vector signal outputted from the roll-off filter 22 is squared by the power calculation circuit 231 to calculate the power. The spectrum at this time is shown in FIG. 14, where the line spectrum in the center of the photograph indicates the zero-point signal of 192 kHz. Namely, since the zero-point is periodically transmitted on the transmission side, the energy for this section is zero, whereas it becomes possible to extract the power spectrum according to the insertion degree of the zero-point.

The power value thus obtained is passed through the band-pass filter 232. Since the band-pass filter having the center frequency of 192 kHz is used in this example, desired zero-point signal information is outputted to the vectorizing circuit 233.

The vectorizing circuit 233 vectorizes the input signal by synthesizing the input signal with a signal whose phase is different by 90 degrees, and provides the same to the PLL circuit 24 as timing phase information.

In the PLL circuit 24, the timing phase information from the vectorizing circuit 233 is firstly compared with the phase of a reference point preliminarily known at the comparator 241. The phase difference is filtered to include only a low component by the low-pass filter 242, so that the controlled voltage of the VCXO 245 is controlled by the secondary PLL circuit 243 composed of two integrators and the D/A conversion circuit 244.

After performing the frequency division at the frequency divider 246, the phase information is fed back to the comparator 241 to be compared with the phase at the reference point. Thus, the phase difference between the timing phase information from the vectorizing circuit 233 and the reference point is pulled in or nullified thereby enabling the extraction of the zero-point signal whose synchronization is established. Also, the sample timing signal to the A/D converter 16 is outputted from the VCXO circuit 245, and is finally fed back to the comparator 241 to compose a phase locked loop.

Figure 15:
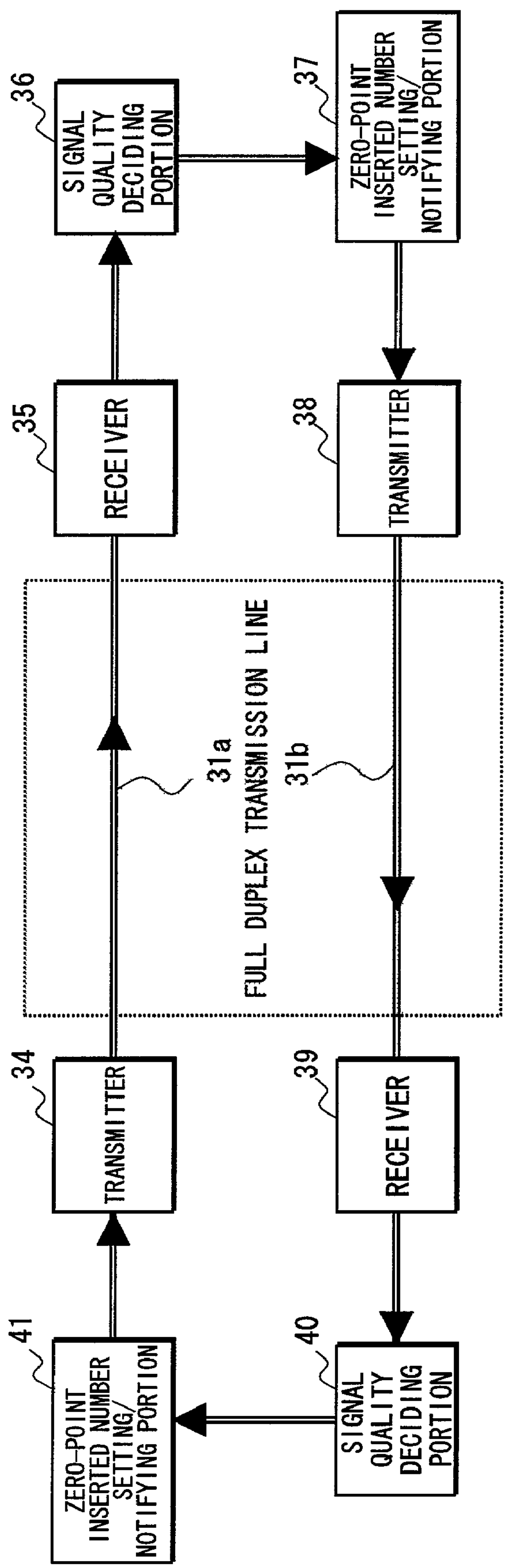
FIG. 15 is a block diagram showing an example of a zero-point control system by the present invention.

As for the zero-point inserted into the transmission signal, various embodiments as shown in FIGS. 8A–8E can be taken into account in the above embodiment. Namely, it is not necessary to fix this zero-point interval, but it is possible to control the zero-point interval as shown in FIG. 15.

Namely, in the transmission/reception system where two transmitters 34 and 38 are respectively connected to receivers 35 and 39 across full duplex transmission lines 31*a* and 31*b*, a deciding portion 36 for deciding the signal quality by the output signal from the receiver 35 is provided. If the decision result is provided to a zero-point inserted number setting/notifying portion 37, which determines the zero-point inserted number, and notifies the information to a zero-point inserted number setting/notifying portion 41 through the transmission line 31*b* to set the zero-point number of the transmitter 34.

Similarly, the signal quality is decided by a signal quality deciding portion 40 provided in the same way as the signal quality deciding portion 36, based on the signal received by the receiver 39 from the transmitter 38 through the transmission line 31*b*. If the zero-point inserted number setting/notifying portion 41 determines the zero-point inserted number based on the decision result and notifies the same to the transmitter 38, this transmitter 38 also performs the insertion control of the zero-point in the same way as the transmitter 34.

Accordingly, the zero-point interval as shown in FIGS. 8A–8E can be adaptively changed based on the signal quality of the transmission line.

The above-mentioned frequency shift portion 3, as shown in FIG. 11, provides the fixed rotation vector signal B. However, it is also possible to automatically change this vector signal.

Figure 16:
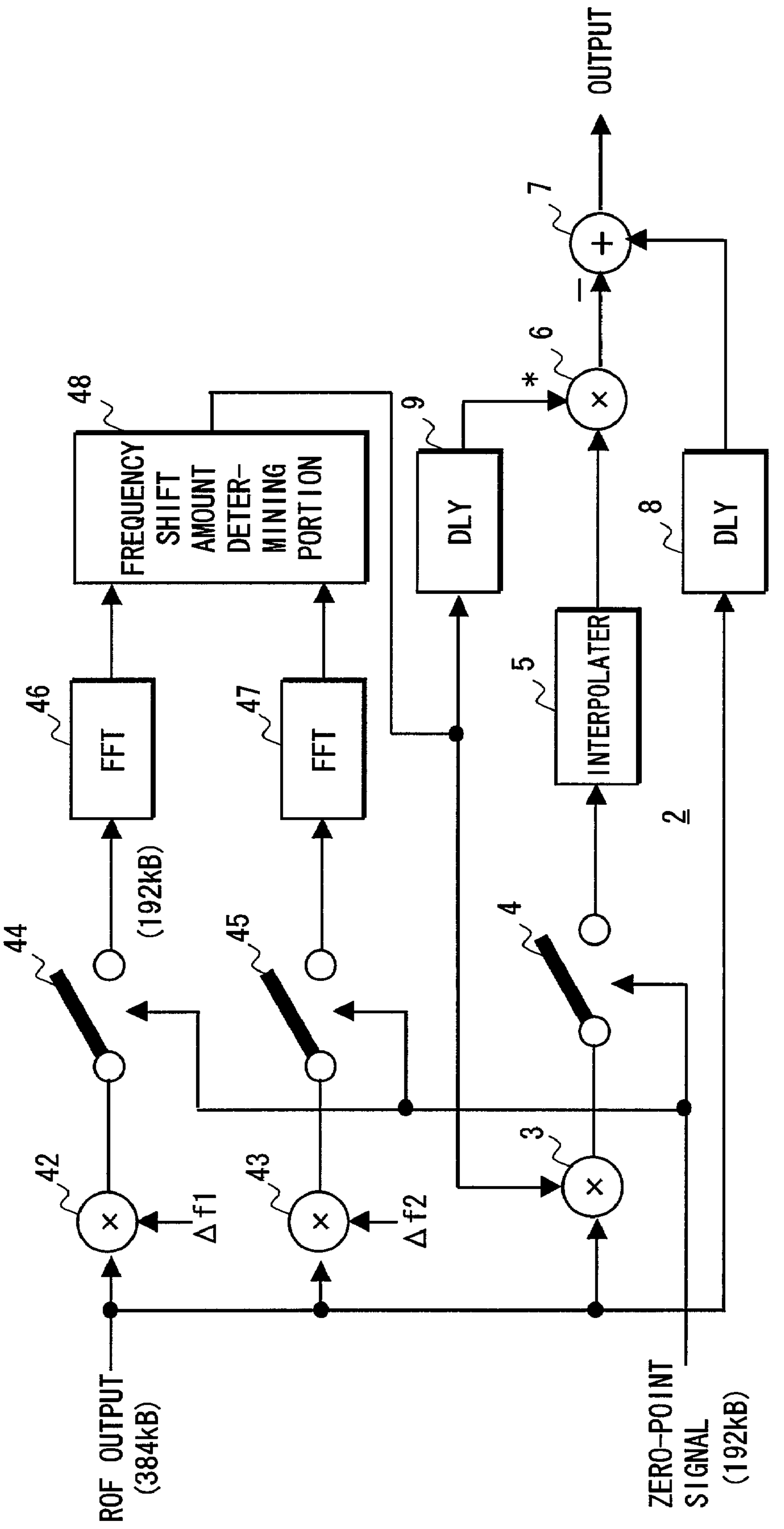
FIG. 16 is a block diagram showing an arrangement of an automatic frequency shift by the present invention.

FIG. 16 shows an arrangement of such an automatic frequency shift, in which multipliers 42 and 43, decimators 44 and 45, FFT calculators (operating unit) 46 and 47, and a shift amount determining portion 48 are additionally provided in the noise canceler 2 in FIG. 11.

In operation, carrier signals Δf1 and Δf2, where the frequencies of the outputs from the roll-off filter 22 are respectively shifted by 90 degrees mutually by the multipliers 42 and 43, are multiplied, and are respectively decimated to obtain the signals of the rate 192 kB at the decimators 44 and 45. Then, the signals are converted into the frequency signals by the FFT calculators 46 and 47, and determines which frequency bandwidth has the largest noise bandwidth at the frequency shift amount determining portion 48, so that the determined frequency shift amount is provided to the frequency shift portion 3.

It is to be noted that the reason for using two FFT calculators is because the frequency bandwidth of the input signal is 192 kB, a half of the whole bandwidth.

Figure 17:
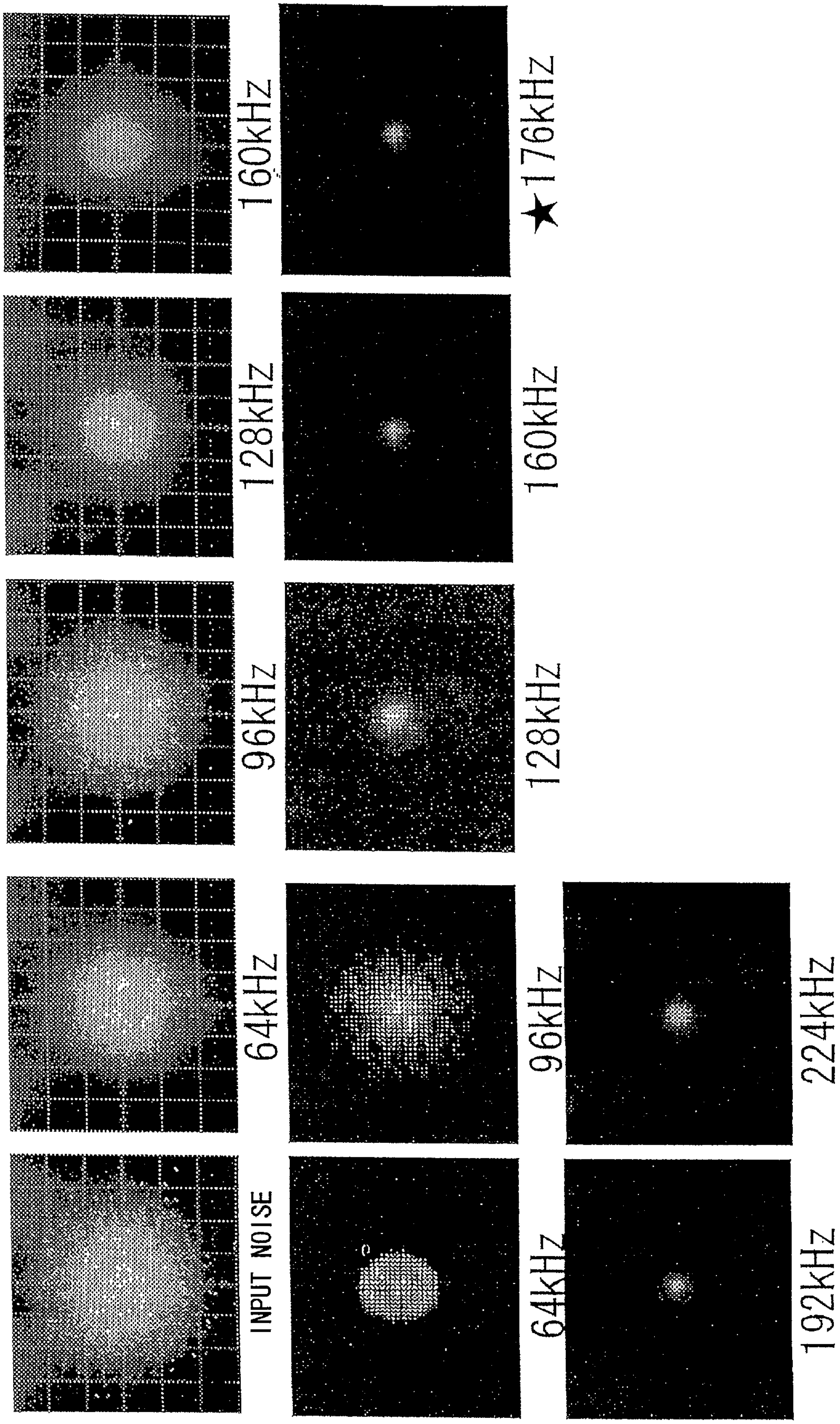
FIG. 17 is a diagram showing an example of a noise decrease by a frequency shift amount by the present invention.

FIG. 17 shows a noise reduction state in case where the frequency shift amount is variously shifted. In this case, it is found that the reduction effect is the largest over the range of 128 kHz–224 kHz.

What kind of frequency shift is determined for a desired noise canceling range will now be described referring to FIGS. 18A–18C.

Firstly in an example of the power-line carrier communication, 165.2 kHz (165 kHz+0.24 kHz=165.24 kHz) is prescribed for a special carrier AM modulation method, and 162 kHz (132 kHz+kHz=162 kHz) is prescribed for a special carrier PM modulation method. Therefore, in case the interpolation filter 52 (see FIG. 12) of the noise canceler 2 uses the cos-squared filter with a roll-off rate 14.5% as shown in FIG. 9B, a noise canceling range equal to or less than 174 kHz and equal to or more than 10 kHz (10 kHz–174 kHz) can be applied by considering this roll-off rate, so that both methods can favorably coexist.

Figure 18:
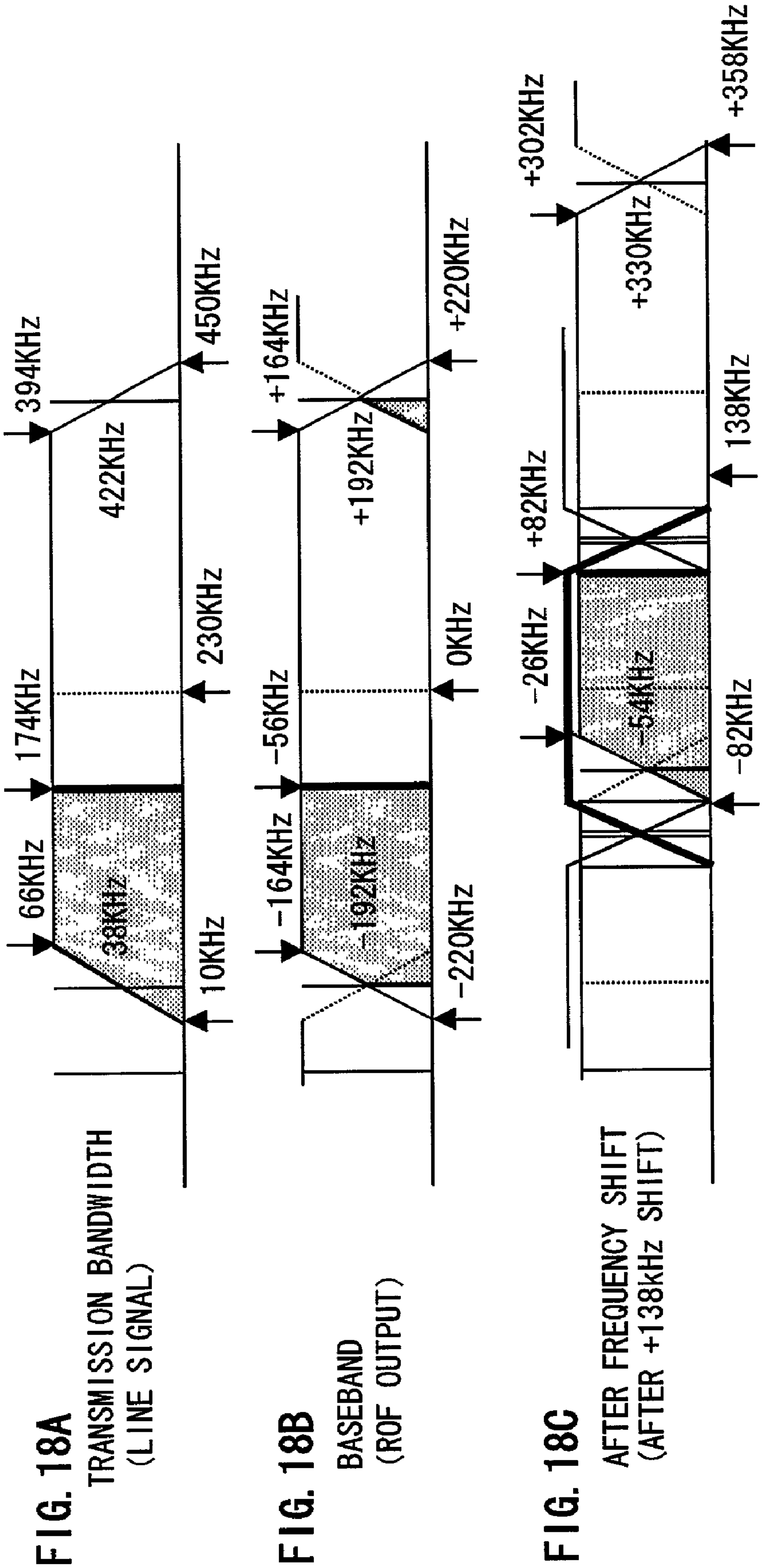
FIGS. 18A–18C are diagrams of a frequency bandwidth showing an example for obtaining a frequency shift amount to a noise bandwidth desired to be canceled by the present invention.

This is shown by the transmission bandwidth in FIG. 18A. In the permitted transmission bandwidth 10 kHz–450 kHz, 230 kHz corresponds to the center frequency, and the noise canceling range 10 kHz–174 kHz corresponds to the hatched portion.

The baseband signal bandwidth at the time when the signal of such a transmission bandwidth is outputted from the roll-off filter 22 of the modem shown in FIG. 10A is shown in FIG. 18B. In this case, the bandwidth of ±192 kHz around 0 kHz can be obtained. Accordingly, 10 kHz–174 kHz in FIG. 18A corresponds to −220 kHz–−56 kHz in FIG. 18B.

On the other hand, the frequency bandwidth processed by the interpolation filter 52 is decimated to the half, that is 192 kHz by the decimator 4. Therefore, considering the roll-off rate 14.5% of the cos-squared filter, 164 kHz can be obtained, so that the baseband assumes 164/2=±82 kHz.

Figure 7:
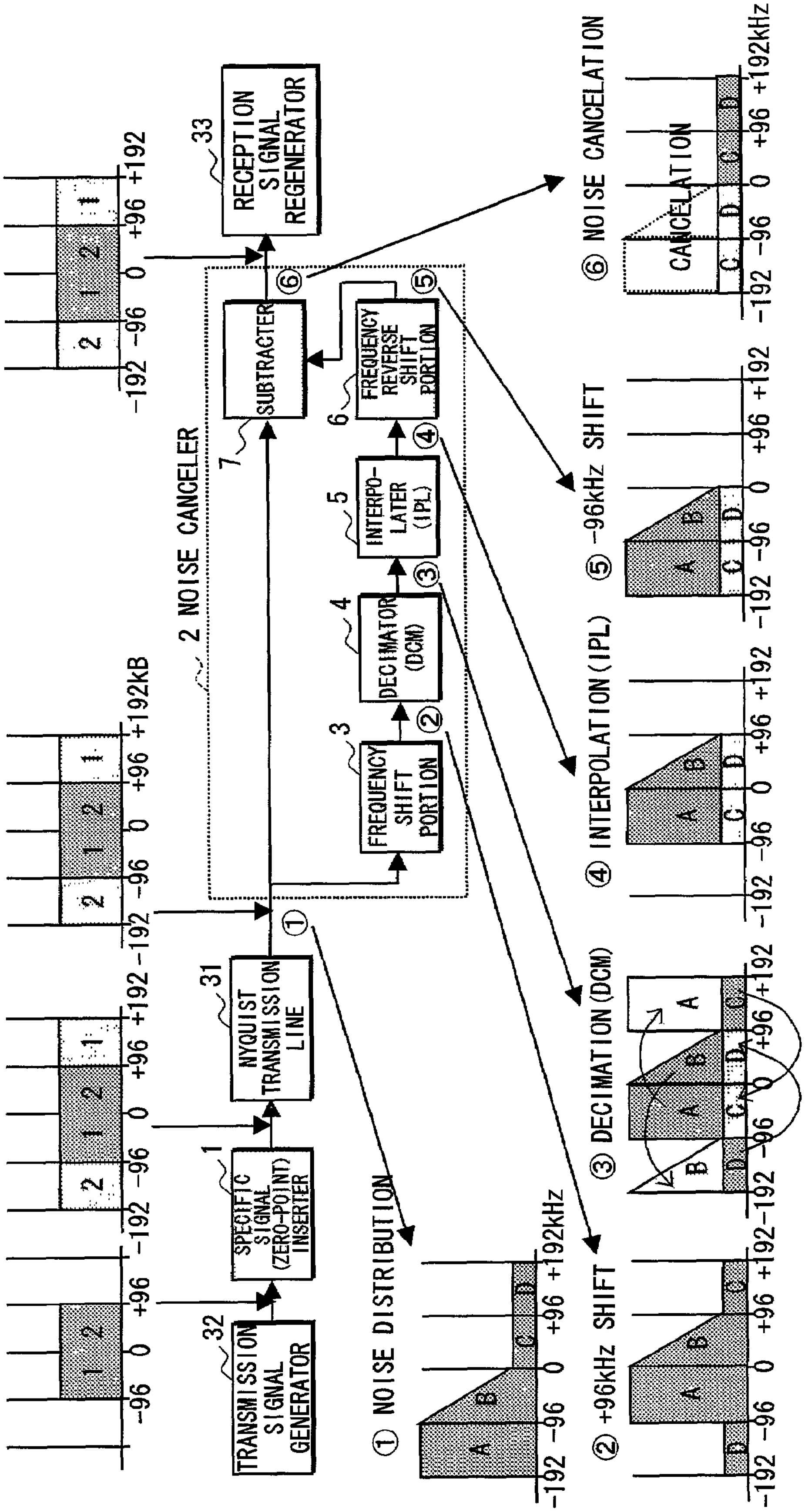
FIG. 7 is a diagram showing a canceling process of a noise component of the present invention.

Accordingly, in order that the upper bound frequency +82 kHz of the interpolation filter 52 accords with the upper bound frequency −56 kHz of the noise bandwidth shown in FIG. 18B, the shift of 56+82=138 kHz has only to be performed. In the example of FIG. 7, +96 kHz is only used for convenience' sake description.

It is to be noted that in case the automatic frequency shift as shown in FIG. 16 is performed, the noise bandwidth 10 kHz–174 kHz of FIG. 18A itself shifts.

Figure 19:
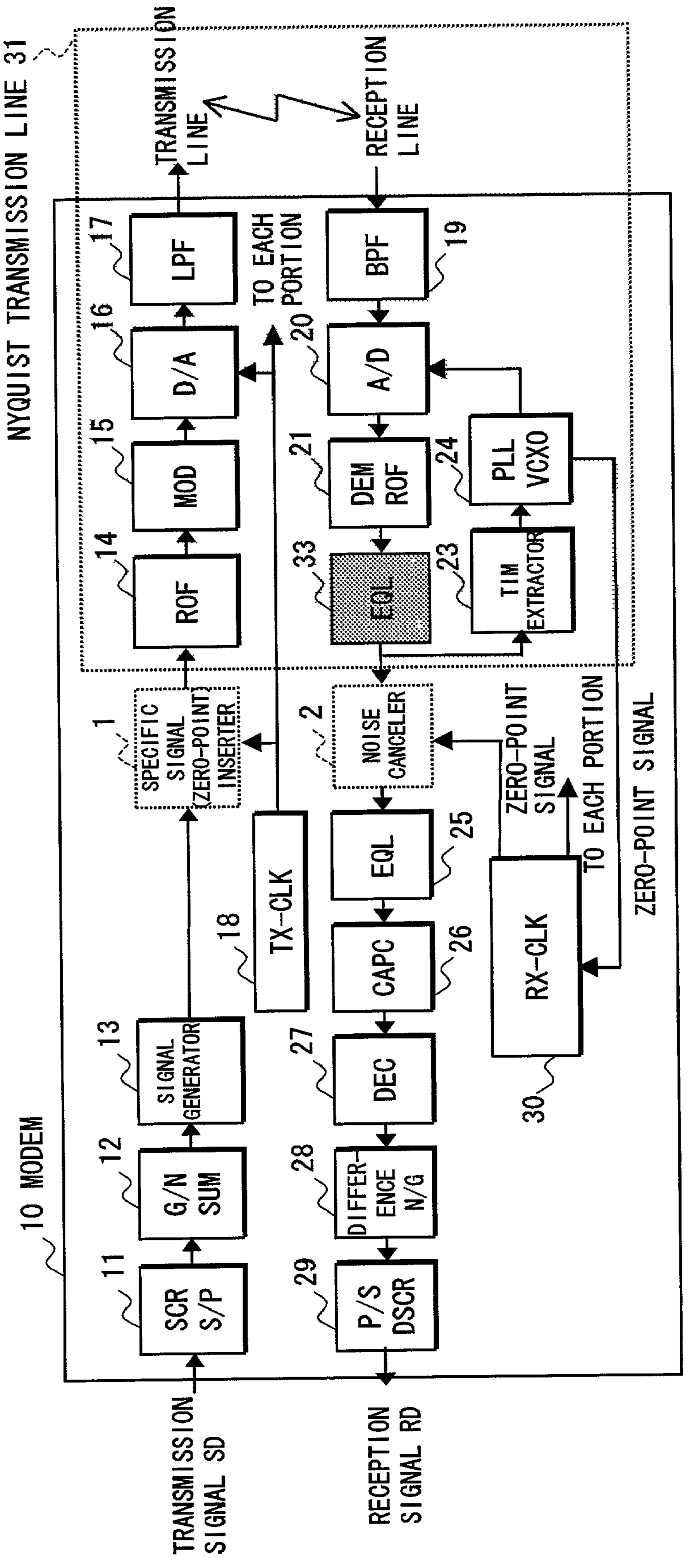
FIG. 19 is a block diagram showing a modification, added with an equalizer, of the present invention.
Figure 20:
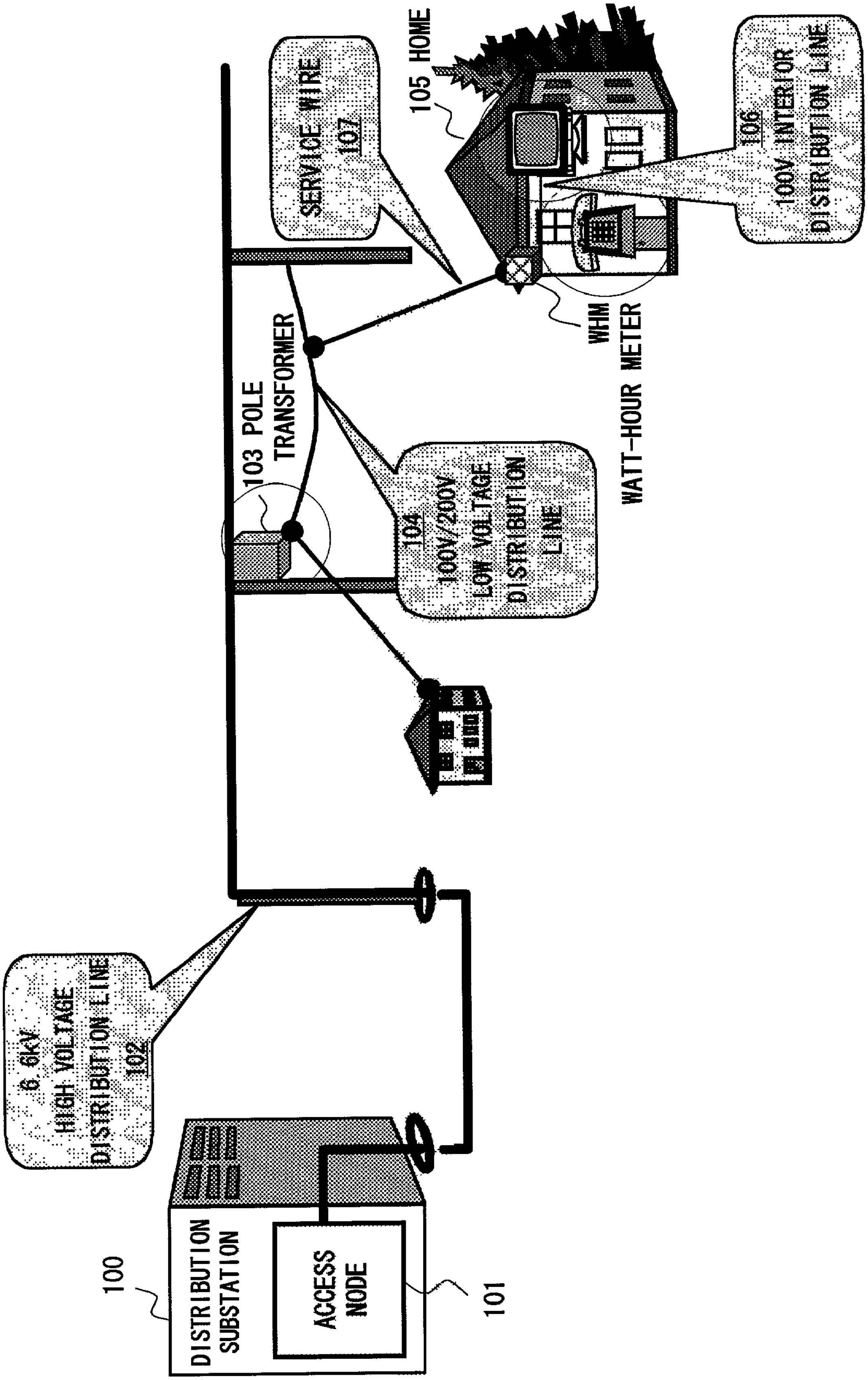
FIG. 20 is a schematic diagram for illustrating an applicable field of the present invention.
Figures 21A, 21B, 21C:
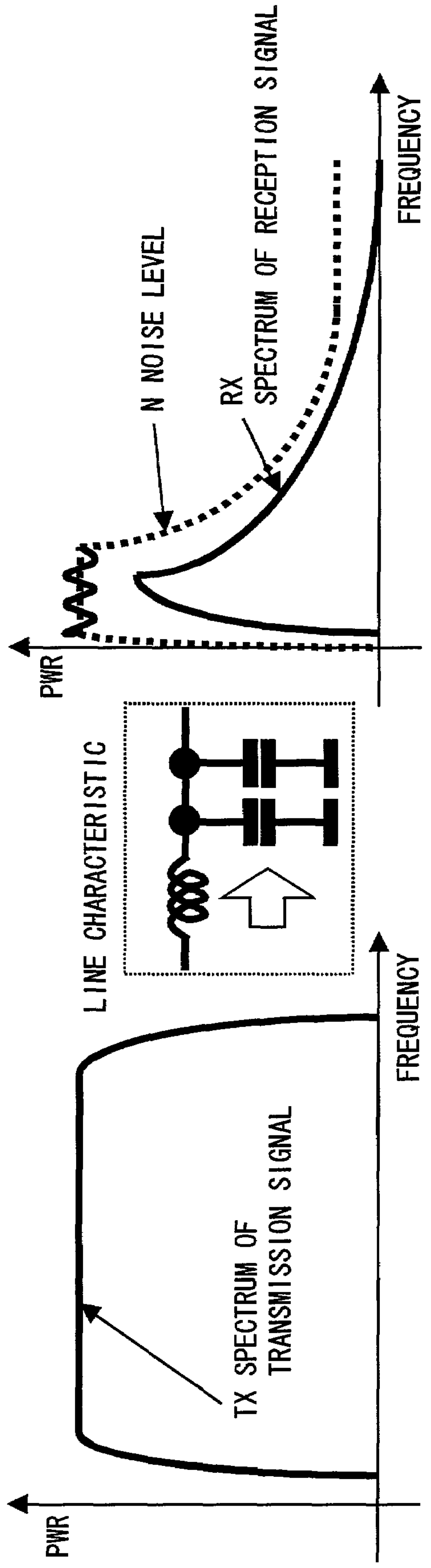
FIGS. 21A–21C are diagrams for illustrating prior art problems.

Also, in the embodiment shown in FIG. 10A, the noise canceler 2 of the present invention inputs the output signal of the roll-off filter 22 as it is. However, if an equalizer (EQL) 33 is provided on the output side (former stage of noise canceler 2) of a demodulator/roll-off filter (DEM/ROF) 21 (corresponding to filter 22 in FIG. 10A) as in a modification shown in FIG. 19, and the intersymbol interference is preliminarily removed, it becomes possible to perform a more effective noise cancelation.

In this case, the equalizing process is divided so that the equalizer 33 may perform a time equalization, for example, and the equalizer 25 may perform a frequency equalization, for example.

Although the time equalization and the frequency equalization are known for an equalizer in the ADSL field, a quite large effect can be achieved by the time axis equalization alone.

As described above, a noise canceling method and an apparatus therefor according to the present invention is arranged so that a signal in which a time axis, an amplitude, and a phase are specified or a zero-point signal is inserted into a transmission signal, a noise component is interpolated by using the specified signal or the zero-point signal, and an originally transmitted signal is regenerated by subtracting the noise component from a received signal. Therefore, it becomes possible to realize a high-speed data transmission by an effective noise cancelation in a low frequency band with less signal attenuation, even in circumstances with a number of noises, especially in a state where the S/N value is minus such as in a power-line carrier.

Also, a noise canceling method and an apparatus therefor according to the present invention can be similarly applied not only to the power-line carrier modem, but also to the CATV modem, the ADSL modem, the VDSL modem, the 2.4 G wireless LAN, the wireless transmission field, and the optical transmission field.

Furthermore, the high recording density can be realized for a signal buried in the noise due to the enhanced speed such as a magnetic disk by accurately taking out the signal.

Moreover, a noise canceling method and an apparatus therefor according to the present invention can be applied to a process of taking out the signal from the noise in the multi-valued transmission technology of semiconductors, and can contribute to the enhanced speed of the semiconductor performance. Furthermore, the application to the fields troubled by various noises such as in the voice recognition, the image compression, the demodulation of the bar code scanner, and the like is made possible.

We claim:

1. A noise canceling method comprising the steps of:

periodically inserting a zero-point into a transmission signal, establishing synchronization based on a received signal, extracting the zero-point based on the established synchronization end interpolating a noise component of the received signal by using the zero-point, and subtracting the noise component from the received signal, wherein the step of interpolating includes steps of performing a frequency shift of the received signal to a desired frequency bandwidth, decimating according to the zero-point, performing an interpolation, and finally performing the frequency shift in a reverse direction so as to adjust to an original signal, thereby generating the noise component of the received signal.

2. The noise canceling method as claimed in claim 1, wherein one or more zero-points are inserted at intervals of an integer number of samples.

3. The noise canceling method as claimed in claim 2, wherein an inserted number of the zero-points is determined by deciding a signal quality on a reception side to be notified to a transmission side.

4. The noise canceling method as claimed in any one of claims 1 to 3 wherein a transmission line of the received signal includes a transparent transmission line.

5. The noise canceling method as claimed in claim 4, wherein the transparent transmission line includes a Nyquist transmission line.

6. The noise canceling method as claimed in claim 1, wherein for the step of interpolating, the zero-point is inserted into the decimated signal, and a low-pass filter process for making an interpolation bandwidth a transmission bandwidth is further performed.

7. The noise canceling method as claimed in claim 6, wherein the low-pass filter process includes a cos-squared filter process for making the interpolation bandwidth a Nyquist bandwidth.

8. The noise canceling method as claimed in claim 6, wherein the low-pass filter process includes a cos filter process for making the interpolation bandwidth a Nyquist bandwidth.

9. The noise canceling method as claimed in claim 1, wherein a frequency bandwidth, in which a noise frequency component is large, is detected in the received signal so that the amount of the frequency shift is automatically determined for the desired frequency bandwidth.

10. The noise canceling method as claimed in any one of claims 1, to 3 wherein an automatic equalizing process is further performed so as to remove an intersymbol interference at a former or latter stage of a noise cancellation.

11. A noise canceling apparatus comprising:

means periodically inserting a zero-point into a transmission signal, means establishing synchronization based on a received signal, means extracting the zero-point based on the established synchronization and interpolating a noise component of the received signal by using the zero-point, and means subtracting the noise component from the received signal, wherein the means for interpolating include means for performing a frequency shift to the received signal to desired frequency bandwidth, means for decimating according to the zero-point thereafter, means for further performing an interpolation, and means for performing the frequency shift in a reverse direction so as to adjust to an original signal, thereby generating the noise component of the received signal.

12. The noise canceling apparatus as claimed in claim 11, wherein one or more zero-points are inserted at intervals of an integer number of samples.

13. The noise canceling apparatus as claimed in claim 12, wherein an inserted number of the zero-points is determined by deciding a signal quality on a reception side to be notified to a transmission side.

14. The noise canceling apparatus as claimed in any one of claims 11 to 13 wherein a transmission line of the received signal includes a transparent transmission line.

15. The noise canceling apparatus as claimed in claim 14, wherein the transparent transmission line includes a Nyquist transmission line.

16. The noise canceling apparatus as claimed in claim 11, wherein the interpolation means include a circuit for inserting the zero-point into the decimated signal, and further include a low-pass filter for making an interpolation bandwidth a transmission bandwidth.

17. The noise canceling apparatus as claimed in claim 16, wherein the low-pass filter includes a cos-squared filter for making the interpolation bandwidth a Nyquist bandwidth.

18. The noise canceling apparatus as claimed in claim 16, wherein the low-pass filter includes a cos filter for making the interpolation bandwidth a Nyquist bandwidth.

19. The noise canceling apparatus as claimed in claim 11, wherein the means for performing the frequency shift include means for detecting a frequency bandwidth, in which a noise frequency component is large, in the received signal so that the amount of the frequency shift is automatically determined for the desired frequency bandwidth.

20. The noise canceling apparatus as claimed in any one of claims 11 to 13 wherein an automatic equalizer is further provided for removing an intersymbol interference at a former or latter stage of a noise cancellation.

21. A noise canceling method comprising the steps of:

receiving a signal periodically including a zero-point, establishing synchronization based on a received signal, extracting the zero-point based on the established synchronization, interpolating a noise component of the received signal by using the zero-point, and subtracting the noise component from the received signal, wherein the step of interpolating includes steps of performing a frequency shift of the received signal to a desired frequency bandwidth, decimating according to the zero-point, performing an interpolation, and finally performing the frequency shift in a reverse direction so as to adjust to an original signal, thereby generating the noise component of the received signal.

22. A noise canceling apparatus comprising:

means receiving a signal periodically including a zero-point, means establishing synchronization based on a received signal, means extracting the zero-point based on the established synchronization, means interpolating a noise component of the received signal by using the zero-point, and means subtracting the noise component from the received signal wherein the means for interpolating include means for performing a frequency shift to the received signal to a desired frequency bandwidth, means for decimating according to the zero-point thereafter, means for further performing an interpolation, and means for performing the frequency shift in a reverse direction so as to adjust to an original signal, thereby generating the noise component of the received signal.

* * * * *